(12) United States Patent  
Olofsson

(10) Patent No.: US 8,990,701 B2  
(45) Date of Patent: Mar. 24, 2015

(54) GATHERING AND ORGANIZING CONTENT DISTRIBUTED VIA SOCIAL MEDIA

(71) Applicant: Google Inc., Mountain View, CA (US)

(72) Inventor: Kristoffer Andreas Olofsson, Dublin (IE)

(73) Assignee: Google Inc., Mountain View, CA (US)

( * ) Notice: Subject to any disclaimer, the term of this patent is extended or adjusted under 35 U.S.C. 154(b) by 123 days.

(21) Appl. No.: 13/650,085

(22) Filed: Oct. 11, 2012

(65) Prior Publication Data

US 2014/0108946 A1   Apr. 17, 2014

(51) Int. Cl.
*G06F 3/00* (2006.01)
*G06Q 50/00* (2012.01)

(52) U.S. Cl.
CPC ....................................... *G06Q 50/01* (2013.01)
USPC ........................... 715/739; 715/744; 715/765

(58) Field of Classification Search
None
See application file for complete search history.

(56) References Cited

U.S. PATENT DOCUMENTS

| | | | |
|---|---|---|---|
| 8,813,107 B2* | 8/2014 | Higgins et al. | 725/10 |
| 2008/0133737 A1* | 6/2008 | Fischer et al. | 709/224 |
| 2008/0320139 A1* | 12/2008 | Fukuda et al. | 709/226 |
| 2009/0024463 A1* | 1/2009 | Szeto | 705/14 |
| 2010/0153848 A1* | 6/2010 | Saha | 715/721 |
| 2010/0268574 A1* | 10/2010 | Butcher et al. | 705/10 |
| 2010/0324704 A1* | 12/2010 | Murphy et al. | 700/94 |
| 2012/0221382 A1* | 8/2012 | Kidron | 705/14.1 |
| 2013/0232200 A1* | 9/2013 | Knapp | 709/204 |
| 2013/0246530 A1* | 9/2013 | Lentzitzky | 709/204 |

* cited by examiner

*Primary Examiner* — Matt Kim
*Assistant Examiner* — Hua Lu
(74) *Attorney, Agent, or Firm* — Lowenstein Sandler LLP

(57) ABSTRACT

The present disclosure relates to a method for gathering and organizing media content in a social media is provided. The method initiates with providing a stream of postings of media content for a user account and receiving, from the user account, selection of media content provided within the stream. The selected media content is moved from the stream to a playlist interface. The selected media content is organized within the playlist interface into categories based on content type to generate a playlist for the user account. The organized playlist of the selected media content is provided for rendering at a display device that is used for accessing the user account.

20 Claims, 16 Drawing Sheets

GATHERING AND ORGANIZING CONTENT DISTRIBUTED VIA SOCIAL MEDIA

BACKGROUND

Internet applications have grown tremendously over the years. One area that has seen such growth relates to social interaction and media content sharing. Social network users are exposed to a large amount of media content in the form of videos, images, articles, etc. The media content is received in a content stream and is a result of interactions of various users within a social group. Currently, the users are provided with limited options for gathering and organizing the media content in the content stream.

With the growing volume of content received in a user's content stream, keeping track of the content is challenging to a user. Further, a user is restricted in the way he browses the content in the content stream. For example, when a user selects a video content provided in the content stream to watch, the user is restricted to remain in a current tab or in a prescribed scrolling region where the video content is rendering. The user does not have the ability to browse the content in the content stream while watching the video. This is because when the user scrolls down the content stream or moves from one tab to another tab the scrolling region where the video is currently rendering either scrolls up or remains in the old tab. This causes user frustration and leads to unsatisfactory user experience as the user is unable to perform content stream browsing while watching the video content at the same time.

Along similar lines, a user is unable to gather and organize images posted in the content stream within a central location or have the ability to export the organized images for sharing and/or for later viewing leading to further user frustration. Increased user frustration leads to growing user disengagement, making it hard to determine the content that engages a user and the user's current interest.

SUMMARY

Various implementations of the present disclosure provide methods, systems, and computer programs for gathering and organizing media content distributed via social media into a playlist for a user that the user can share with other users. Postings of media content from various users of the social media directed to a user account are gathered and provided to the user in a content stream upon accessing the user account. Selection of media content is received from the user account. The selected media content is moved to a playlist interface available at a display device that is used to access the user account. The media content selected to form the playlist can include any type of digital media that can be rendered on a rendering device associated with the user. As the selected media content is moved to the playlist interface, the media content is automatically organized into specific categories based on content type and a playlist is automatically generated. The playlist for the user account identifies a user's interest in the selected media content of the content stream. An interest indicator for each of the categories within the playlist is maintained for each user account and the corresponding interest indicators are updated for a particular user account as and when the media content is added to/removed from the playlist.

In some implementations, once the playlist is generated for the user account, a media content from the playlist may be selected for rendering at the display device accessing the user account. The selected media content will begin rendering at the playlist interface of the display device and follows the user as the user continues to browse through the content stream. The playlist interface also follows the user as the user switches from one tab to another tab within the user account. In some implementations, upon generation of the playlist, the media content in the playlist can automatically begin rendering at the playlist interface from a specific category in the playlist, without any user action. In some implementations, the rendering of the media content may be in the order the media content was added under the specific category. In some other implementations, the automatic rendering of the media content in the playlist interface may be based on popularity of the media content amongst other users in a social group of the user. In other implementations, other variations for automatic rendering of the media content may be used.

It should be appreciated that the present disclosure can be implemented in numerous ways, e.g., a process, an apparatus, a system, a device or a method on a non-transitory computer readable medium. Several implementations of the present disclosure are described below.

In accordance with some implementations, a method for gathering and organizing content in a social media is provided. The method includes providing a stream of postings of media content for user accounts and receiving selection, from the user account, of media content provided within the stream. The selected media content is moved from the stream to a playlist interface. The selected media content is organized within the playlist interface into categories based on content type to generate a playlist for the user account. The organized playlist of the selected media content is provided for rendering at a display device used for accessing the user account.

In some implementations, the postings are commercial postings or user postings received from one or more users within one or more social groups. The media content in the postings are either user generated or non-user generated.

In some implementations, adding the selected media content further includes determining a category within the playlist for organizing the selected media content based on the content type, placing the selected media content under the category of the playlist, and updating an interest indicator for the category of the playlist that is associated with the user account.

In some implementations, the one or more media content within the playlist is customized.

In some implementations, the customization includes adjusting a ranking of the media content in a particular category based on user interaction for the corresponding media content within the particular category of the playlist.

In some implementations, the customization includes receiving a selection of a subset of the media content and compiling a customized media content of the selected subset of the media content. The selected subset of the media content belong to a particular category or to a plurality of categories within the playlist and the media content within the subset includes at least a portion of the one or more of the media content in the playlist.

In some implementations, the compiling a customized media content further includes adding special effects to the media content within the subset, the special effects are provided using other media content from one or more categories available for the user account.

In some implementations, the media content within the playlist can be dynamically adjusted based on addition or removal of one or more of the media content from the one or more categories in the playlist, the dynamic adjusting includes adjusting interest indicators related to the respective categories in the playlist for the user account.

In some implementations, the playlist is specific to a session or a social group of a user associated with the user account.

In some implementations, a control is provided at the playlist interface to enable sharing of one or more media content within the playlist with other users within one or more social groups of a particular user associated with the playlist. The sharing includes receiving a selection of one or more media content belong to one or more categories from the particular user, receiving distribution information related to select one or more users within the one or more social groups identified for sharing the select media content and forwarding the identified media content to the select ones of the users using the distribution information.

In some implementations, the other users interactions at the shared media content is determined, the interactions indicative of the respective users interest to the shared media content. The interest indicators for the respective categories associated with shared media content of the respective users is updated based on the other users interactions. The updated interest indicators for different categories associated with the different users accounts are used to determine promotional media to the other users.

In some implementations, the playlist returned for rendering includes placement information that is appropriate for the rendering device of the user account.

In some implementations, a playlist manager is provided to execute on a processor of a server, for gathering and organizing content in social media. The playlist manager includes a plurality of modules including a stream manager module, a media selection module, a media categorization module and a playlist rendering module. The stream manager module is configured to validate access to user accounts, receive postings of media content from a plurality of users and provide the media content in a content stream, manage the content stream of postings for the user accounts and analyze the media content within the content stream to identify content type. The media selection module is configured to detect selection of one or more of the media content from the content stream, provide a playlist interface for moving the selected media content and generate a playlist with the selected media content. The media categorization module is configured to automatically organize the selected media content within the playlist into one or more categories based on the content type obtained from the stream manager module. The playlist rendering module is configured to receive the organized playlist from the media categorization module and return the playlist for rendering on a display device used for accessing the user accounts.

In some implementations, the playlist manager further includes a playlist customization module that is configured to provide customization to the media content in the playlist. In some implementations the customization includes any one or more of re-organizing the media content in respective categories based on relative ranking of the media content in the playlist, merging media content within one or more categories in the playlist to generate a customized media content, integrating one or more media content from a second playlist into the respective categories within the playlist.

In some implementations, a playlist ranking module is used to monitor user interaction for the media content within each category of the playlist for the user account of a particular user, and adjust relative ranking of the media content in the respective categories of the playlist associated with the particular user based on monitored interaction.

In some implementations, the playlist manager further includes a playlist sharing module that is configured to provide control at the playlist interface to enable selective sharing of one or more media content within the playlist with other users within one or more social groups of a user. The playlist sharing module is configured to receive selection of one or more media content under one or more categories within the playlist, from the particular user, receive distribution information related to select one or more users within the one or more social groups of the particular user for sharing the media content and forward the identified media content to the select one or more of the other users using the distribution information of the select users.

In some implementations, the system further includes a promotional media engine that is configured to monitor interactions at the media content in each category of the playlist associated with the user account of a particular user to determine interest of the particular user in each category, update interest indicators for respective categories of the playlist associated with the user account of the particular user based on the interactions, and identify promotional media to render alongside the playlist based on interest of the particular user for each category of the playlist.

In some implementations, the system further includes a user interest metrics database that is configured to store the interest indicators in each category of the playlist for the user accounts for subsequent analysis.

In some implementations, a method for gathering and organizing content in a social media is provided. The method includes providing a stream of postings of media content for a user account and receiving a selection of one or more media content provided within the stream. The selected media content is moved from the stream to a playlist interface. The selected media content within the playlist interface is organized into categories based on content. User interaction at the media content in each category of the playlist is monitored, wherein the interaction defines interest of a user to the media content. Promotional media is identified based on the interest of the user obtained through the monitoring. The identified promotional media is returned along with the playlist of the selected media for rendering at a display device of a user.

In some implementations, the moving of the selected media content includes updating interest indicators associated with each category of the media content within the playlist of the user account based on the monitored user interaction and dynamically adjusting relative ranking of the media content in each category of the playlist based on the interest of the user associated with the user account.

In some implementations, the method includes receiving a second playlist having one or more media content in one or more categories, monitoring interactions at select ones of the media content in the second playlist, the interactions define interest of the user for the select ones of the media content in the second playlist and integrating the select ones of the media content from the second playlist into the respective categories of the playlist associated with the user account based on the user's interest. One or more media content from the integrated playlist associated with the user account is selected for sharing with other users within one or more social groups of the user.

In some implementations, the integrating includes providing a control to enable customizing one or more media content in one or more categories of the playlist during integration. The customizing includes receiving a selection of a subset of the media content belonging to one or more categories from the playlist after integration, compiling customized media content by merging the selected subset of the media content and placing the customized media content into one of the categories in the playlist or placing the customized media content in a new category within the playlist. The compiling includes adding special effects to the selected subset of the media content using media content available within the user account.

In accordance with some implementations, a non-transitory computer-readable medium having program instructions embodied thereon for gathering and organizing content in social media is provided. The program instructions include the following: program instructions for providing a stream of postings of media content for a user account and for receiving a selection of media content provided within the stream; program instructions for moving the selected media content from the stream to a playlist interface; program instructions for organizing the selected media content within the playlist interface into categories based on content type to generate a playlist for the user account; and program instructions for providing the playlist of the selected media content for rendering at a display device used for accessing the user account.

These and other implementations may provide one or more of the following advantages. One advantage of the implementation of an organized playlist is that the user has control of the media content that is rendering in a playlist interface and can view/listen to the media content, while the user continues to browse the media content in the content stream. Another advantage is that the playlist provides a easy way to identify the user's interest in specific media content. As the content stream of a user grows, it is hard for a user and the system to keep track of what media content captures a user's interest. The playlist provides an easy and efficient way of allowing a user to select specific media content and automatically organize the selected media content into a short playlist of interesting media content. The organized list of media content identifies the user's interest in various categories. The system can monitor the user's interest by maintaining an interest indicator for the user in each of the categories within the playlist and updating the corresponding interest indicators as and when the user adds, removes or interacts with the media content within the playlist. The information obtained by the monitoring is analyzed by the system to identify additional media content or promotional content for presenting to the user. The additional media content is configured to be rendered alongside the playlist.

Other aspects will become apparent from the following detailed description, taken in conjunction with the accompanying drawings.

BRIEF DESCRIPTION OF THE DRAWINGS

The various implementations may best be understood by reference to the following description taken in conjunction with the accompanying drawings.

FIGS. 4C-1 through 4C-3 illustrate different options available for rendering the generated playlist on a property page, in accordance with some implementations of the present disclosure.

DETAILED DESCRIPTION

Figure 1:
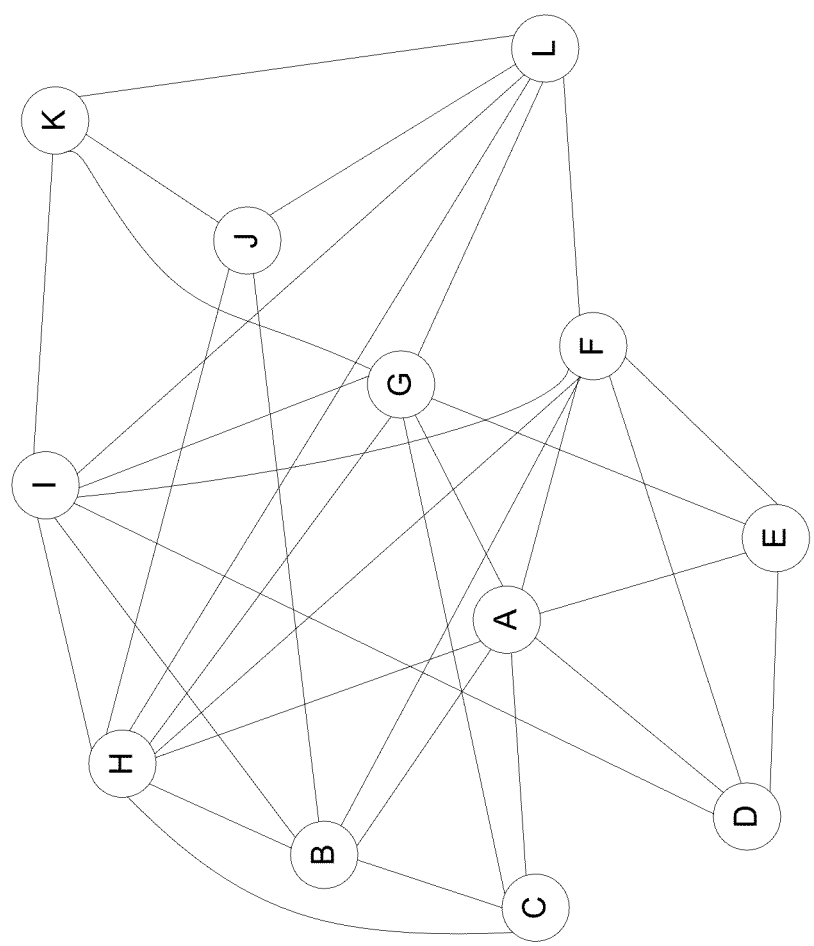
FIG. 1 illustrates a simplified representation of a social graph of a user used in receiving, gathering and organizing media content into a playlist, in accordance with implementations of the present disclosure.

The following implementations describe methods, systems, and computer programs for gathering and organizing content in social media.

It will be apparent, that the present implementations may be practiced without some or all of these specific details. In other instances, well known process operations have not been described in detail in order not to unnecessarily obscure the present implementations.

As a general overview, the system enables receiving postings of media content from various users within a social network, collecting select ones of the media content for a user account in a content stream and providing the content stream for the user account for rendering on a display device used for accessing the user account. Selection of one or more of the media content from within the rendered content stream is received from the user account. The selected media content is moved from the content stream to a playlist interface. A playlist is generated with the selected media content at the playlist interface. The content of the selected media content are analyzed and appropriate categories are determined based on content type. The selected media content in the playlist are organized under appropriate categories based on the content type of the media content. The organized playlist of a user provides a snapshot of the user's interest in the various categories. As the user continues browsing through the media content in the content stream and identifies media content for inclusion in the playlist, appropriate categories within the playlist are dynamically updated with the user's selections.

The system also enables dynamic ranking of media content in the playlist. Dynamic ranking is enabled by maintaining an interest indicator for each category for a user account to identify the interest of the user to the media content in the respective categories. User's interactions for the media content within each category of the playlist are monitored and the respective interest indicators are updated to reflect the current interest of the user. The interest indicators are used to identify one or more promotional or additional media content for rendering alongside the playlist.

The playlist is dynamically updateable and may be session specific or specific to a social group of a user. In some implementations, when the playlist is specific to the social group, the generated playlist is stored in a database for later retrieval. In some implementations, when the user initiates a second or subsequent session, the stored playlist is automatically retrieved and rendered. In some implementations, when the user initiates a second or subsequent session, the stored playlist is retrieved and rendered upon explicit request from the user. As a result, multiple playlists may be associated with a user and the user can retrieve any one of the multiple playlists during subsequent sessions. The playlist can be dynamically refined during current or subsequent sessions by allowing the user to add, remove, or update the media content within one or more categories of the playlist. The media content within the playlist may be set to either automatically render or render upon explicit user interaction. The playlist may also be shared with other users within one or more social groups.

With this overview in mind, various implementations of the current disclosure will now be discussed with reference to the Figures. Users interact with one another in the context of a social network and exchange postings of media content, where users can include real people and entities. A user accesses different network-accessible properties that enable social interaction amongst other users and such interactions are gathered and presented to the user when the user visits/accesses those properties, through user accounts. Examples of network-accessible properties include websites, applications, or other types of objects which can be accessed over the social network. FIG. 1 illustrates a simplified representation of a social network graph that is used for facilitating various implementations of the present disclosure. In FIG. 1, each user is represented by a node and the interaction(s) between any two users is represented by an edge. A user's social contacts are those users with which the user has direct or indirect interactions. For e.g., user A interacts directly with users B, C, D, E, F, G and H. User A interacts with user L indirectly through either users F, G or H, with user I through users B, D, G or H, and so on. Each of the user's social contacts (direct and indirect) may be part of one or more social groups associated with the user. In the context of the present disclosure, user A may generate a posting of media content by accessing a property. User A may also receive postings of media content from any of the users who accessed the property and are part of one or more of the social groups of user A. The postings of media content from the different users are gathered and provided to user A in a content stream when user A accesses the property through the user account.

Figure 2:
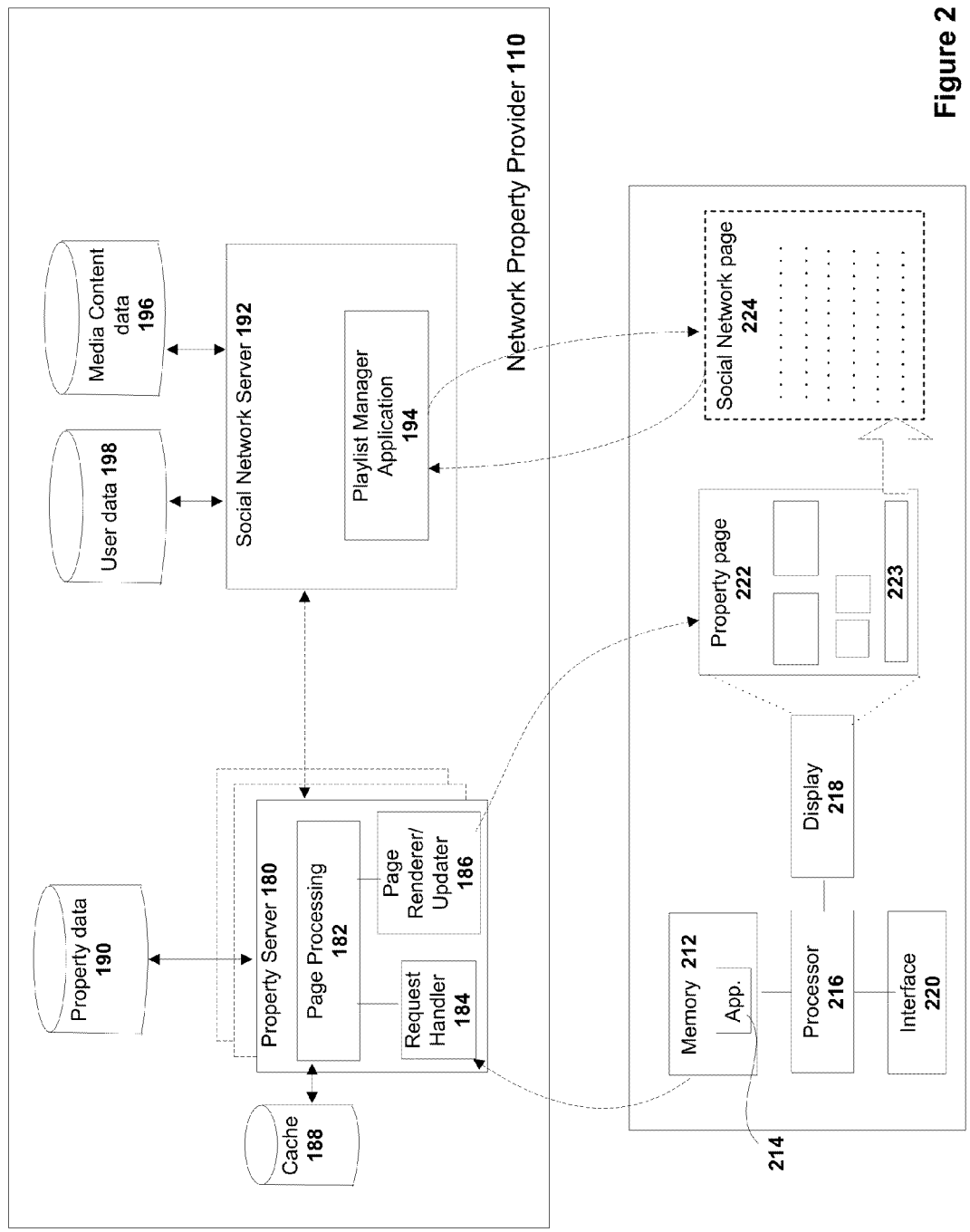
FIG. 2 illustrates a simplified block diagram of a sample architecture of a system used for receiving, gathering and organizing media content into a playlist, in accordance with implementations of the present disclosure.

FIG. 2 illustrates a system that is used for facilitating collection and organization of postings of media content in a social media network, in accordance with implementations of the disclosure. A user accesses a user account on a property through a client device 210, which may be any device that may be configured to access a property that is part of a social media network. The device 210 should be broadly construed to include various kinds of mobile and non-mobile computing devices, and may include multiple subsidiary computing devices. By way of example and not limitation, the client device 210 can be a personal computer system, a laptop computer, a tablet computer, a smartphone, etc. The client device 210 includes memory 212 (both volatile and non-volatile memory) for storing client-side processor-executable instructions. The device 210 further includes a processor 216 for executing the instructions, and a display 218 for accessing the user account and for displaying pages of the property or social network to the user. It will be understood that pages of the property or the social network are to be broadly construed to include any type of representative display of the property or social network. Thus, by way of example, a page can be a webpage, a view provided by an application, or any other type of visual representation of the property or the social network. An interface 220 may include any of various interface mechanisms, e.g., a keyboard, mouse, touchpad, touchscreen, joystick, accelerometer, or any other type of mechanism by which a user may provide input to the device 210. The interface 220 also includes client-side application programming interface (API) to communicate with a server-side API to upload data and/or display information related to the property or the social network, request and receive data and/or display information related to the property or the social network. In some implementations, the property or the social network related display information include postings of media content that is distributed by or exchanged between the users accessing the property or the social network. In the illustrated implementation, an application 214 executes from memory 212. In some implementations, the application 214 is a web browser. However, in other implementations, the application 214 can be any other type of application useful for accessing the property or the social network.

Still referring to FIG. 2, a server 180 (e.g. property server) is provided for interacting with the device 210 through the server-side API to allow processing and delivery of data related to a specific property or the social network, to enable users to access and interact with the property or the social network, to generate postings of media content and other data and exchange/share such postings. In one implementation, the server 180 is a web page server. In other implementations, the server 180 can be any other type of server suitable for communicating with the device 210 to enable the user to access the property or the social network. As shown, the server 180 includes a request handler 184 for receiving and parsing requests from the client-side application 214. A page processing module 182 performs processing in order to service a particular request, e.g., a request for a property page or a request for an update to a property page. In some implementations, the page processing module 182 retrieves data from a property data storage 190, which contains content data that defines content displayed on the property page. The page processing module 182 may also store data to and retrieve data from a cache 188. By way of example, property related data including media content data that are frequently accessed may be stored in the cache 188 to enable faster retrieval upon the next receipt of that request. A page renderer/updater 186 sends data to the device 210 to render or update a property page 222 on the display 218 of the device 210.

Although a single property server 180 has been described above with reference to FIG. 2, it will be appreciated by those skilled in the art that there may be any number of property servers configured to provide users with access to various properties. In some implementations, multiple properties may be owned or operated by a single network property provider 110. In such a configuration, the activities of users can be readily determined across the various properties of the network property provider 110. Furthermore, the network property provider 110 may also provide a social network, which may facilitate integration of services amongst various properties in combination with the social network.

In some implementations, the single property server 180 or the network property provider 110 may manage access to any of the properties or the social network by providing user authentication modules, manage user preferences and any other activities related to access and management of user accounts and user-related media content data. The property server or the network property provider monitors activities of users across the various properties as well as the social network.

Figure 3:
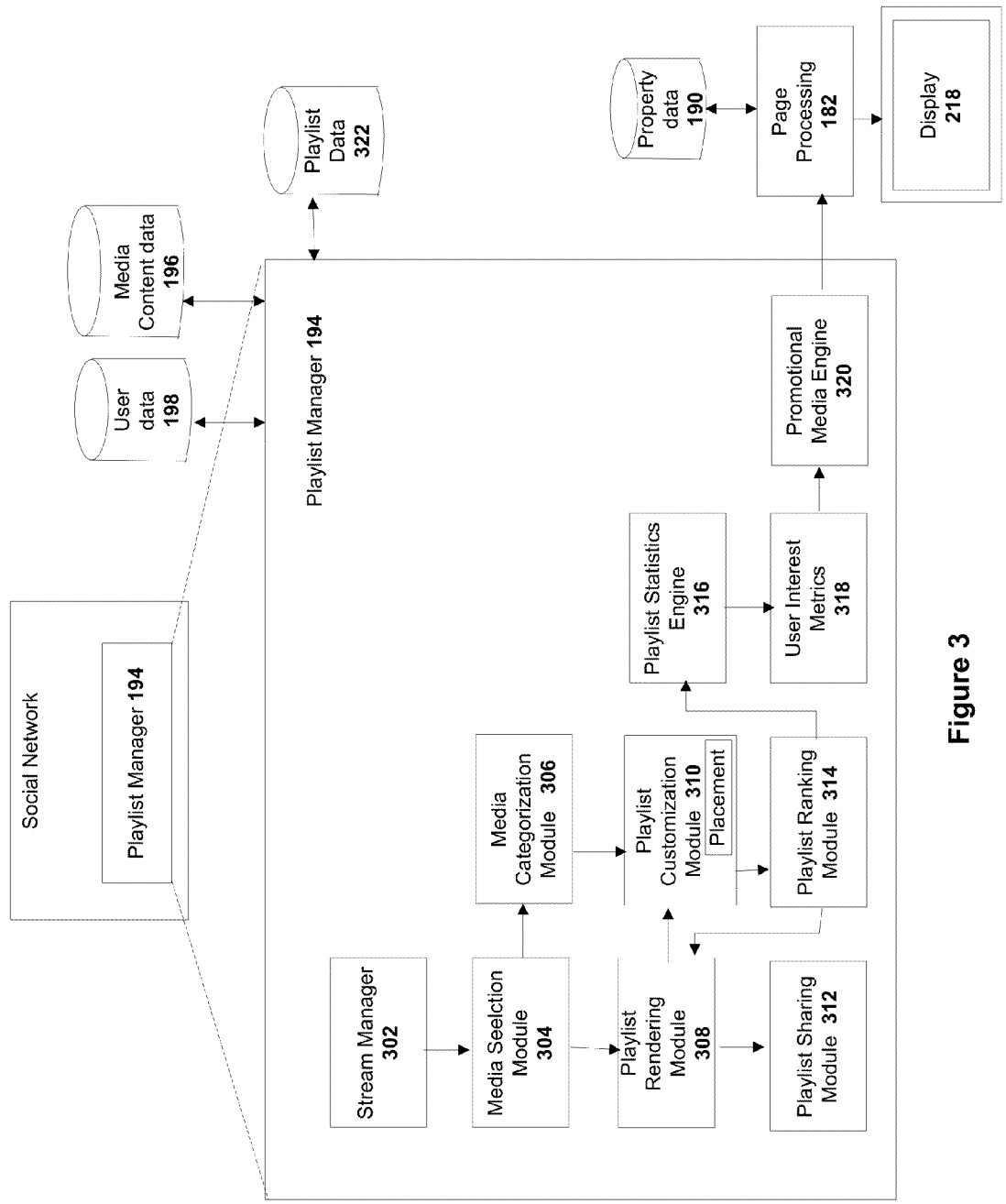
FIG. 3 illustrates the various modules of a playlist application illustrated in FIG. 2 that is used for gathering and organizing media content, in accordance with implementations of the present disclosure.

The property server 180 or the network property provider 110 interacts with a playlist manager 194 within a social network server 192 for managing user accounts and providing user access to the social network. A sample playlist manager module 194 is illustrated in FIG. 3. In some implementations, the playlist manager is a server-side application that is stored in memory (either volatile or non-volatile) of the server and executed by a processor of the server for gathering postings of media content in the social network for a user account, providing the postings of media content in a content stream, selecting and organizing select media content into a playlist for the user account. The playlist manager module 194 receives postings of media content data related to user interactions in the social network and gathers user-related media content data for a user account of a specific user from user data storage 198 and media content data storage 196 and returns the user-related data to the page processing 182 for inclusion in the property page 222 returned to the display of device 210 in response to the property request. The property page 222 returned to the display includes property page content and postings of media content returned in a content stream. The content stream may be rendered at the property page 222 or on a separate page through an option 223 provided in the property page. When the option 223 at the property page 222 is selected, the content stream of media content is rendered in a separate social network page 224. Updates to the rendered postings of media content at either the property page or at the social network page are provided directly by the playlist manager 194. One or more of the media content from the postings in the content stream rendered at the property page or the social network page, are selected to generate a playlist for the user of the device. The selected media content are moved from the content stream to a playlist interface and organized into categories based on the content type to generate a playlist. The generated playlist is presented on the playlist interface. The playlist interface is a dynamically moving interface that follows a user within the property page as the user browses through the content stream and/or moves from one tab to another in the property page. The media content from within a category of the playlist may be selected for rendering at the playlist interface automatically or through user action and the playlist interface provides the user with the ability to view and control the rendering of the selected media content while allowing a user to continue to browse through the content stream or move from one tab to another within the property page. In some implementations, the playlist interface provides the ability to view a source of any media content within the playlist through activities at the playlist. For e.g., the playlist interface provides users with the ability to click on a media content in the playlist once to render the selected media content at the playlist interface and twice to view the source of the media content from where the media content was selected for posting. The aforementioned way to render and access the source should not be considered restrictive. Other ways of selecting the media content from the playlist for rendering and for accessing the source may be employed. The source of the media content may be accessed to obtain additional information related to the media content.

In one implementation, the playlist manager 194 includes a plurality of modules to identify the media content provided in the stream of postings by different users, manage the media content in the stream (i.e. content stream), detect activities at select ones of the media content in the content stream, move the select ones of media content to a playlist interface, organize and manage the media content within the playlist interface and return the organized media content for rendering and sharing. FIG. 3 illustrates a sample playlist manager identifying the various modules that are used in some implementations of the present disclosure. As illustrated, the plurality of modules within the playlist manager 194 are used to provide access to the social network and to data shared by users of the social network and to manage such data for the users. In one implementation, the playlist manager includes a stream manager module 302, a media selection module 304, a media categorization module 306, and a playlist rendering module 308. The playlist manager 194 also includes a playlist customization module 310, a playlist sharing module 312, playlist ranking module 314, playlist statistics engine 316, user interest metrics 318 and an advertisement engine 320. The above list of modules are not to be construed as limiting. In some implementations, one or more of the modules may be integrated into other modules while retaining the functionality of the modules. For e.g., the playlist ranking module 314 and playlist statistics engine 316 may be integrated with the playlist customization module 310. The playlist manager 194 retrieves and updates data available in social media content storage 196, user data storage 198, and playlist data 322. Additionally, the social network data from the playlist manager 194 is forwarded to the display 218 of device 210 through the page processing 182. The functionality of each of the module will now be described with reference to FIG. 3.

The stream manager module receives a user account access request to access the social network and data related to the social network from a particular user of the device 210. The stream manager module receives the user authentication information for the user account, validates the user authentication information for the user account through one or more user authentication process and provides access to the property page, to the social network and to the data related to the social network upon successful validation of the authentication information for the user account. In some implementations, the stream manager module stores and retrieves user related data from user data storage 198 for validation and postings of media content related data from social media content data storage 196. Media content related data can include various types of information, including metadata information defining the media content, additional information related to source of the media content, multimedia objects including photos, videos, music, articles of publication, images, user entries, posts, weblogs, maps, and any other type of information associated with and provided through the users activities on the social network. In response to successful validation of the authentication information for the user account, the stream manager module identifies and gathers the various postings of media content for the user account from the social media content data storage 196 and packages the postings of media content into a content stream and returns the content stream for presenting at the display 218 of the device 210. The media content include any type of data provided by the particular user and/or by other users within the particular user's one or more social groups of the social network.

The media selection module monitors user activities at the media content in the content stream and detects selection of the one or more media content rendered in the content stream as the user browses through the content stream. An interface is provided to capture such select activities. The interface provided by the media selection module is a playlist interface that is rendered alongside the content stream and is used to capture the select activities of the user. For e.g., the user browses through the media content in the content stream and identifies specific ones of the media content that captures the user's interest. In some implementations, media selection module detects the selection of the specific ones of the media content in the content stream and moves the selected media content from the content stream to the playlist interface. In other implementations, the media selection module identifies user activity at the select ones of the media content. In this implementation, the selected media content recognizes the user activity of dragging and dropping of the selected media content from the content stream into the playlist interface. In response to the moving of the selected media content from the stream to the playlist interface, the media selection module generates a playlist of the selected media content within the playlist interface for the user account. In some implementation, the playlist is generated if a playlist does not already exist for the user. In such implementations, if a playlist already exists for the user, the media selection module organizes the newly added media content within the playlist. In another implementation, the playlist is generated every time the user account is accessed by the user. In such implementations, a plurality of playlists may be associated with the user.

The playlist interface provides a venue or a canvas on the property page for collecting and organizing the selected media content into a playlist that the user can manage and maintain. In some implementations, the selection of the media content from the content stream for adding to the playlist interface is carried out through a double-click activity at the selected ones of the media content. In yet other implementations, the media selection module can detect mere selection of the media content and mark such selections by generating a tag, a flag, etc., and automatically moving such selected media content into the playlist interface.

Figure 4A:
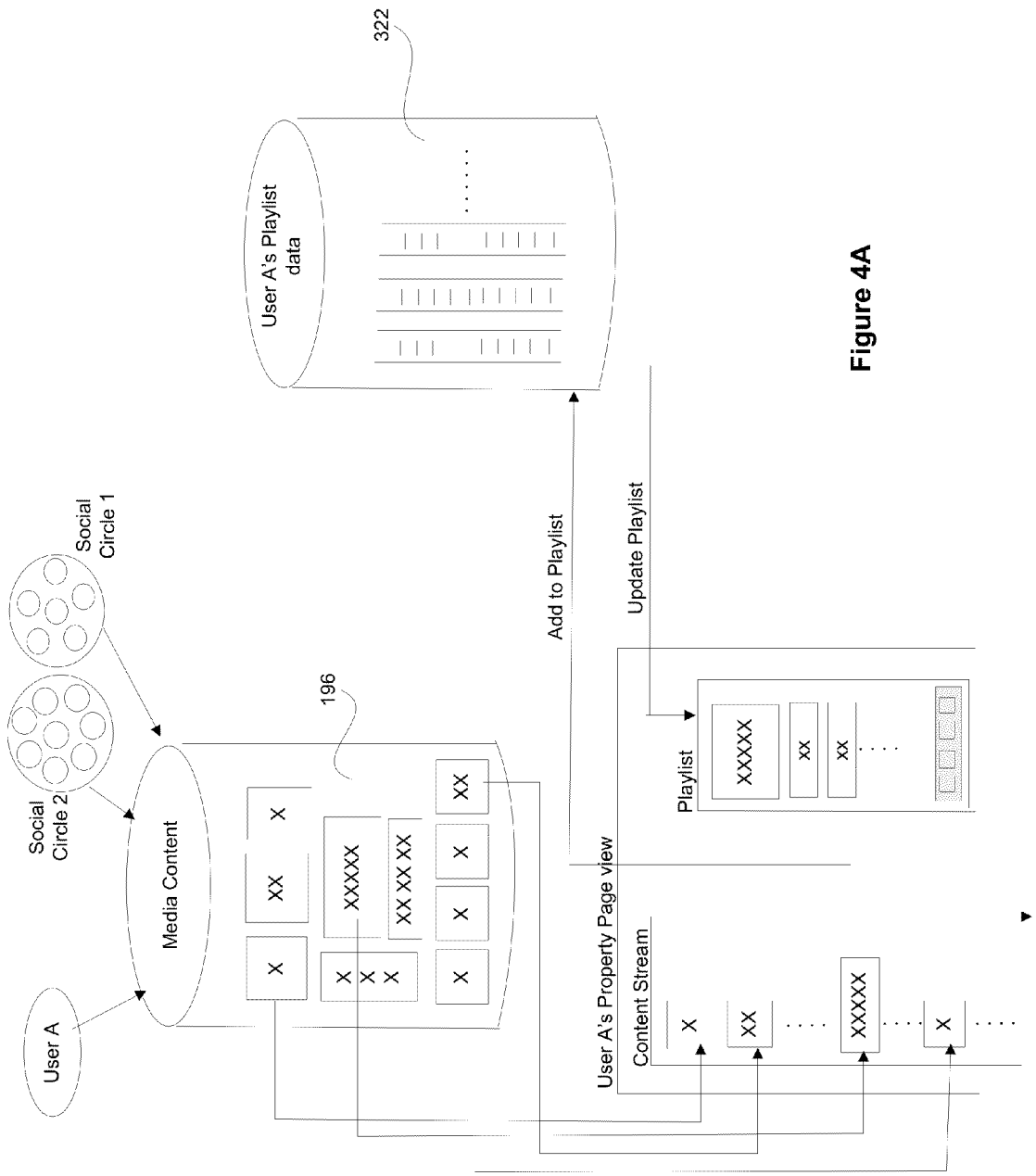
FIG. 4A illustrates a simplified process of generating a playlist using media content from a content stream, in accordance with implementations of the present disclosure.

FIG. 4A illustrates a simplified representation of a sample playlist for a user generated through user interactions at the property page rendered at the display portion of the device used for accessing user account, in some implementations. Upon successful validation of the information provided for accessing the user account, a user is presented with a stream of postings of media content. As the user browses through the content stream and selects specific ones of the media content to add to the playlist interface, the selected media content is updated to the user's playlist data within the playlist data storage 322. The selected playlist includes media content that is provided in the users postings. In some implementation, the postings may include commercial postings and/or user postings. In some implementation, the user postings are received from one or more users within one or more social groups. The media content provided in the postings include user generated content within one or more social groups (e.g., social group 1, social group 2, etc., of the user A) and/or non-user generated content. The playlist data storage 322 maintains the playlist data of one or more playlists for each user account.

In some implementations, the playlist of a user is specific to a particular session of a user associated with the user account. In such implementations, upon termination of a current user session, the playlist data for the particular session of the user is deleted. In some other implementations, the playlist is specific to a social group of a user associated with the user account. In such implementations, the playlist data for the user account is maintained in the playlist data storage 322 and retrieved for rendering and updating during subsequent sessions of the user. In some implementations, the playlist data for the playlist generated during different sessions of a particular user are maintained separately in the playlist data storage 322 allowing the user to have multiple playlists. In such implementations, the user may retrieve any one of the playlists and update the playlist data during subsequent session or the user may generate a new playlist that is specific for the subsequent session. During the subsequent session, a media content may be selected and added to the playlist rendered in the playlist interface by moving the media content from content stream to the playlist interface. The media content data may have been provided through a posting by the user or by another user within the one or more of the social groups of the user.

Figure 4B:
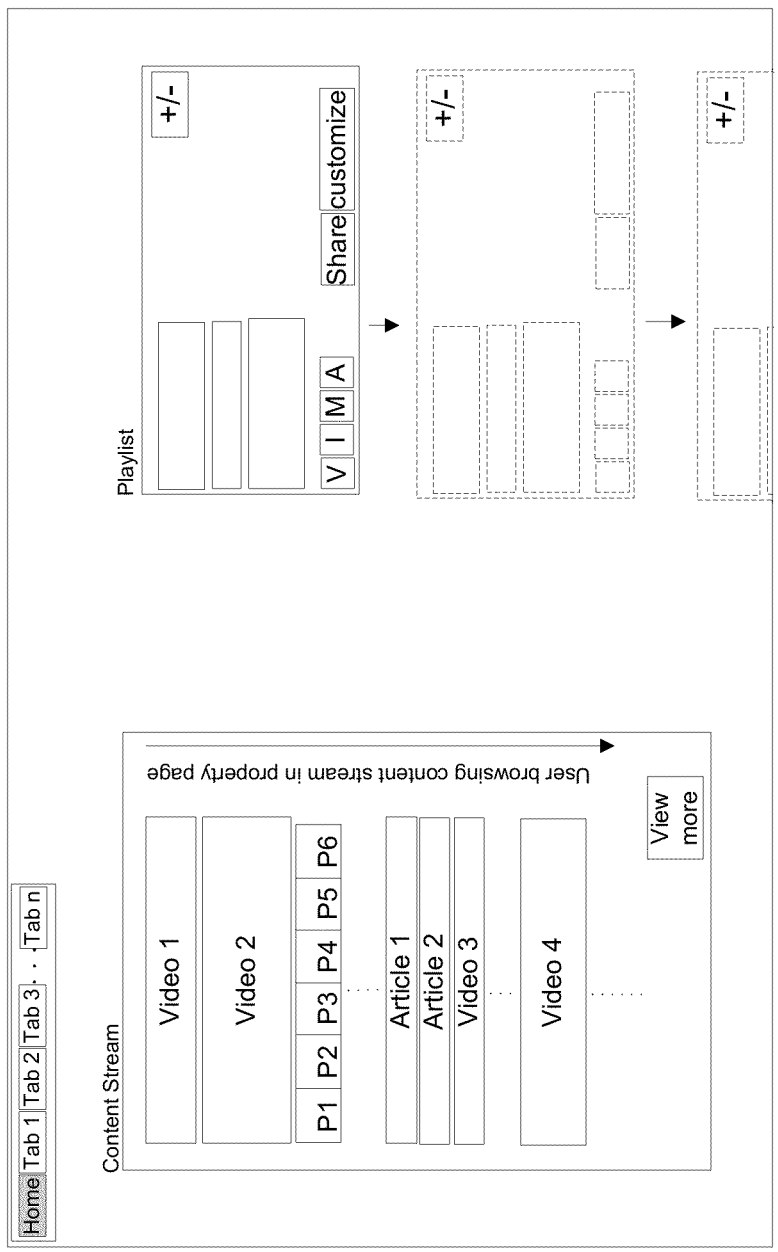
FIG. 4B illustrates a simplified rendition of a generated playlist and various options available within, in accordance with implementations of the present disclosure.
Figures 2, 4C:
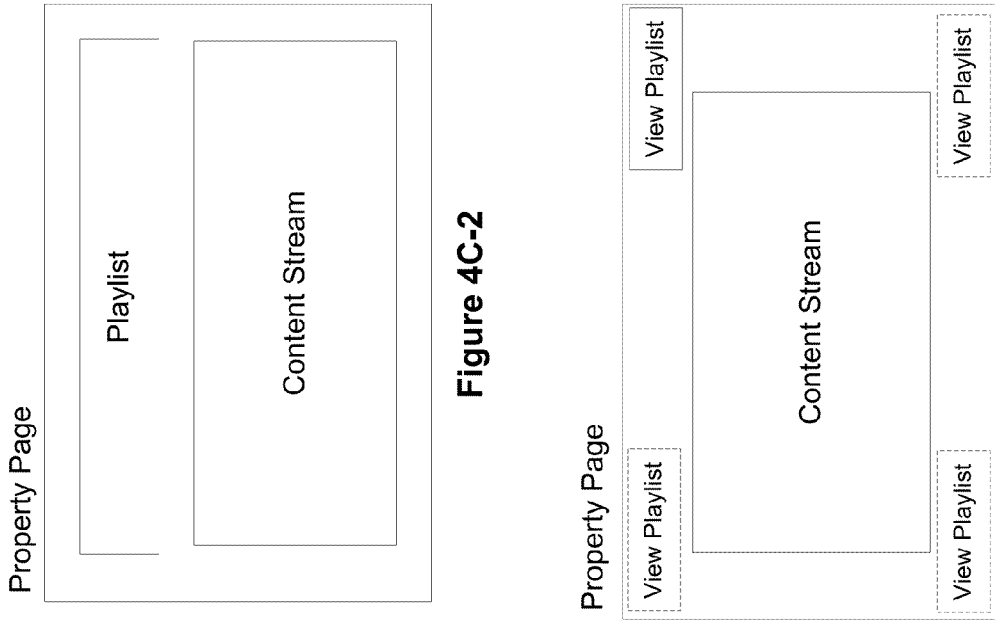
Figures 3, 4C:
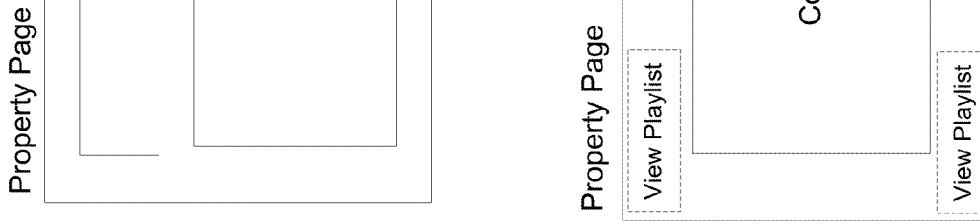
Figures 1, 4C:
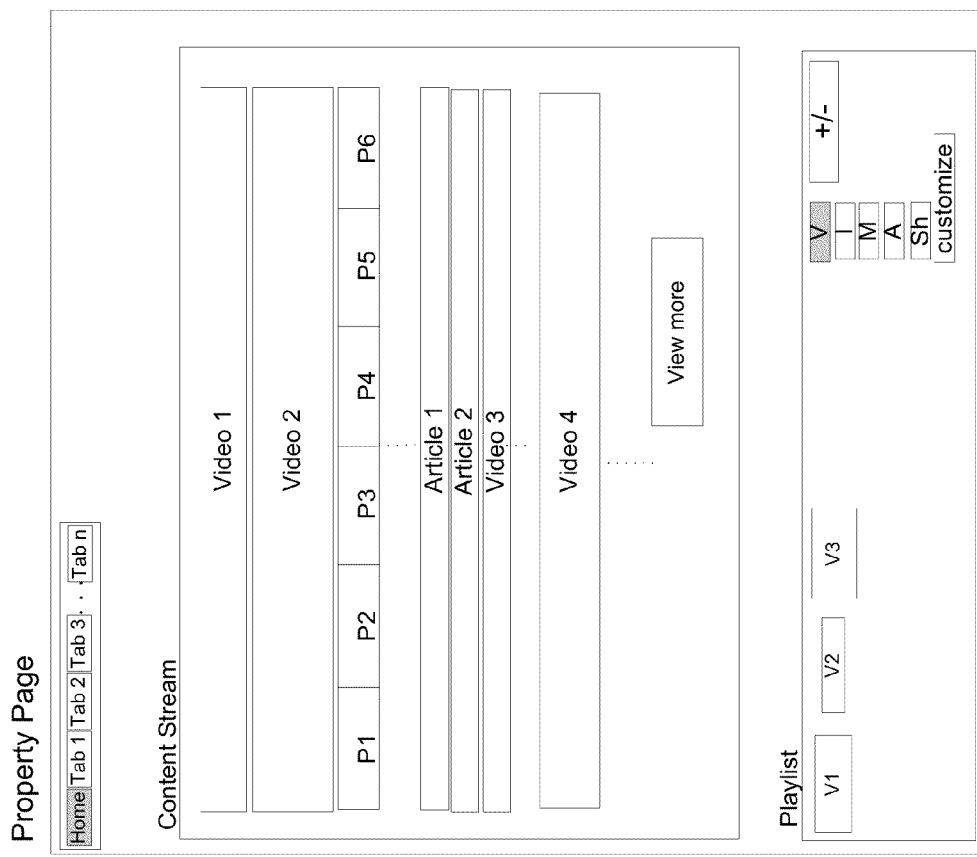

The generated playlist grows in media content as the user continues to browse the content stream, identifies select media content, and adds the identified select media content into the playlist interface. The playlist interface is a dynamically moving interface that moves with the user within the property page as the user browses through the content stream. FIG. 4B illustrates the dynamic nature of the playlist interface. As illustrated, the dotted rectangles represent the movement of the playlist interface as the user browses down the content stream. Additionally, the playlist interface provides other options for the user to customize the appearance, location and media content within the playlist and for sharing a part or all of the media content within the playlist with other users. For e.g., as illustrated in FIGS. 4C-1 through 4C-3, the playlist interface is not restricted to a single location but can be located anywhere on the property page and the location is user driven. In addition to customizing the location, the appearance of the playlist interface on the property page may be customized based on the user's preference. For e.g., the user may prefer to have the playlist interface minimized during regular browsing and maximized when the user wants to add or adjust the playlist or during rendering of a media content within the playlist. As illustrated in FIGS. 4C-1 through 4C-3, the playlist interface provides the option for such customizations. The dynamic nature of the playlist interface allows a user to control and view media content that is being rendered on the playlist interface while allowing the user to browse through the content stream.

Figure 4D:
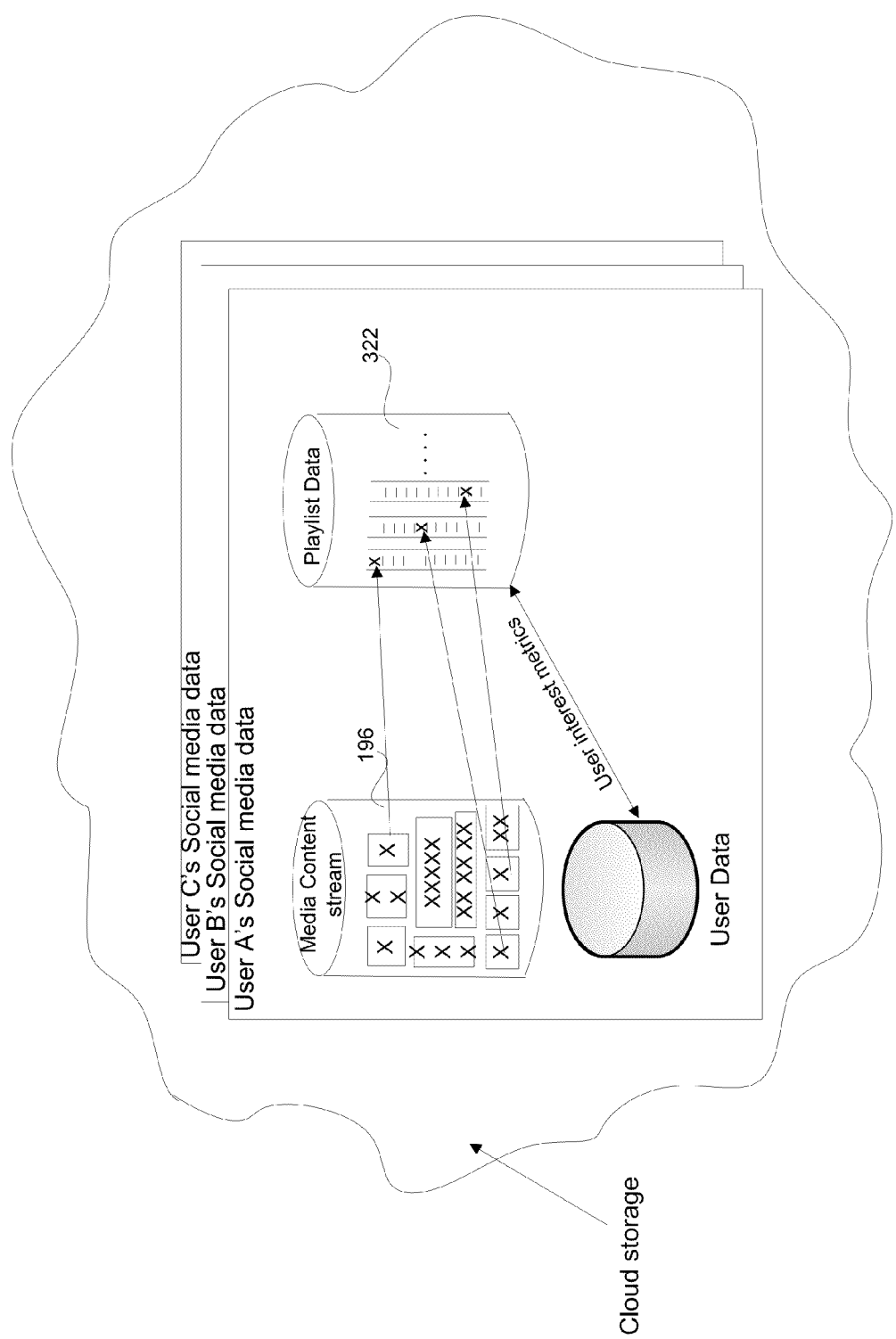
FIG. 4D illustrates a simplified representation of cloud storage for storing user and media content related data, in accordance with implementations of the present disclosure.

The information associated with the customization of location, appearance and media content of the playlist is stored in the playlist data storage 322. Such information includes at least data related to user preferences for rendering the playlist interface, data related to the media content, categorization information, etc. In some implementations, information related to the playlist are obtained from the user data storage 198, social media content storage 196, and playlist data storage 322 that are stored in the server or in one or more servers accessible for retrieval by the stream manager 302 as and when such data is required. In some implementations as illustrated in FIG. 4D, such information may be stored in the cloud storage accessible and retrievable by the stream manager 302.

The media selection module 304 generates a playlist of the selected media content. For instance, the media selection module interacts with the stream manager 302 to obtain information related to the media content presented in the postings at the property page. The media selection module 304 also detects selection of one or more media content for inclusion into the playlist through user actions/activities at the respective media content rendered in the content stream, provides a playlist interface to gather the selected media content, moves the selected media content into the playlist interface and generates a playlist for the selected media content. During the generation of the playlist, the media selection module may determine if a playlist already exists for the particular user. If a playlist already exists, the media selection module may provide an option to either select the existing playlist to update or to generate a new playlist for the user. Based on which option is selected, the media selection module 304 then interacts with the media categorization module 306 to generate and organize the playlist.

Continuing to refer to FIG. 3, the media categorization module 306 detects the additions or updates provided by the media selection module to media content at the playlist interface, analyzes the content associated with the additions/updates, identifies the categories for the additions/updates based on the content type and dynamically updates the respective categories in the playlist accordingly. In some implementations, the categories available within the playlist interface for organizing the media content include videos, images, articles, and music. The above list of categories should not be considered limiting. Additional categories may be provided in the playlist interface. For e.g., status updates, quotes, etc., can also be added as categories. In some implementations, the media categorization module 306 may generate sub-categories within each category and organize the selected media content into respective sub-categories based on the analysis. The media categorization module 306 continues to perform the tasks of detection, analysis and categorization during the user session.

In some implementations, the media categorization module 306 organizes the media content within the playlist in an order the media content is added to the playlist interface and then re-organize the media content under one or more categories/sub-categories based on user activities detected at the media content under respective categories/sub-categories in the playlist. In such implementations, the re-organization can include moving the media content from one category to a different category or from one sub-category within a category to a different sub-category within the same or a different category. In some implementations, the media content within the playlist is organized based on activity and rating associated with it. In such implementations, the activity and rating information for the media content within the playlist may be included with the media content data when the media content was moved from the content stream to the playlist interface. The rating may be provided by users in the social network and the ratings are tabulated to determine the popularity of the media content amongst the users.

In addition to categorizing the media content, the media categorization module 306 generates interest indicators for each category and for each sub-category within each category of the playlist for the user associated with the user account when the playlist is initially generated and updates the interest indicators in the respective categories and sub-categories as and when the playlist is adjusted. The adjustment of the playlist includes addition, removal or updating of the media content within one or more categories/sub-categories in the playlist. The media categorization module may store the interest indicators for each user in the respective user's data within the user data storage 198 and retrieve the interest indicators of the user for subsequent updates by other modules in the playlist manager and/or for subsequent analysis.

Referring back to FIG. 3, the playlist rendering module 308 of the playlist manager 194 receives media content information from the media selection module and the organization information from the media categorization module and formats the playlist with the selected media content and returns the formatted playlist to the page processing 182 of the property server. The page processing 182 integrates the playlist data with the page content data and returns the page to the display 218 of the device 210 for rendering. The playlist interface with the organized media content are rendered at the display of the device and follow the user as the user browses through the content stream within the property page.

In some implementations, the playlist interface not only provides a place or canvas to gather and render a playlist of selected media content but also provides a place to render the selected media content within the playlist. In some implementations, when the media content is selected and moved to the playlist interface from the content stream in the property page, the media content may cease or pause rendering at the property page. Instead, the playlist rendering module may begin to render the media content at the playlist interface. In some implementations, after the media content is added to the playlist, the media content is rendered at the playlist interface based on explicit user actions for the media content at the playlist interface, wherein the user actions may include selection of the media content for rendering at the playlist interface. In some other implementations, the playlist rendering module may automatically begin rendering the media content as soon as it is moved from the content stream to the playlist. In some implementations, the media content may be rendered in an order of their addition into the playlist under each category. For e.g., if a video content, video 1, was added first under video category, then audio 1 was added under the audio category, a second video content, video 2, was added under video category, photos 1, 2 were added under images/photos category, article 1 was added under the article category, and images 1 and 2 were added under images/photos category, then in the current implementations, the playlist rendering module determines the order of automatic rendering of the media content to be video 1, video 2, audio 1, photos 1, 2, images 1, 2 and article 1, respectively. The sequence of the categories for categorization rendering may be pre-defined or user-driven. In some other implementations, the media content may be rendered in an order of their selection into the playlist across all categories. Using the above example, the order of rendering of the media content in the such implementations would be video 1, audio 1, video 2, photos 1, 2, article 1, and images 1 and 2, respectively.

Figure 5:
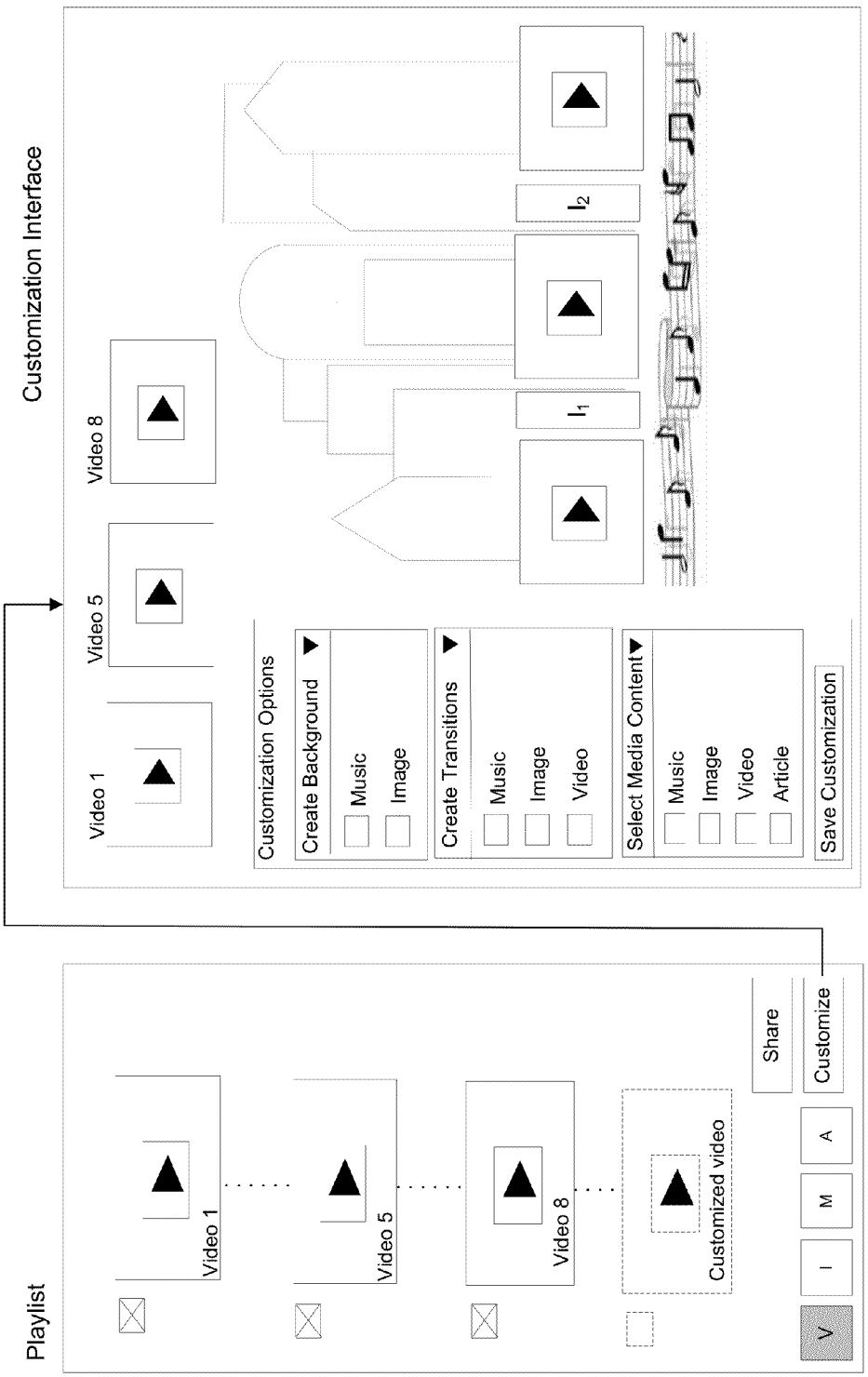
FIG. 5 illustrates a simplified representation of providing customization of one or more media content within a stream, in accordance with implementations of the present disclosure.

Referring now to FIGS. 3 and 5, the playlist manager provides customization of one or more media content in the playlist by providing a customization control 510, at the playlist interface. FIG. 5 illustrates customization of media content in the playlist using playlist customization module 310. In some implementations, the customization control 510 may be provided as a button, an icon, etc., at the playlist interface. A selection of the customization control 510 at the playlist interface triggers execution of the playlist customization module 310. In some implementations, upon activation, the playlist customization module 310 receives user selection of media content from within the playlist and the playlist customization module customizes the selected media content to generate one or more customized media content. The playlist customization module 310 provides a customization interface for customizing the one or more media content within the playlist. FIG. 5 illustrates a customization interface with a select list of customization options that may be provided by the playlist customization module during customization of one or more media content within the playlist. Some of the customization options available for generating customized media content include background, foreground, images, music, type of transition required, etc. It should be noted that the list of customization options should not be considered restrictive or limiting. Additional or different customization options other than the one listed may be provided for customizing the media content.

In some implementations, the media content selected for customizing belong to a single category. For e.g., two or more images from image/photo category may be selected to generate a customized image/photo media content. The playlist customization module merges the selected images to generate a customized image/photo media content. In some implementations, the customization may result in a customized media content that may be categorized under a different category than the one that the media content selected for customization belong. For e.g., two or more images from the image category may be selected for customization and the resulting customized media content may be a customized video that is placed under video category within the playlist. In other implementations, the media content selected for customization is not restricted to a single category but can be selected from different categories, different sub-categories within one category or within multiple categories. In addition to providing the merging option, the playlist customization module 310 may provide additional customization by enabling addition of special effects to the customized media content. In some implementations, the playlist customization module 310 may identify one or more media content available to the user account for providing the special effects. For e.g., a image may be selected and integrated into the customized photo media content so as to provide a transition to the selected images. In some implementations, the playlist customization module 310 may analyze the media content selected for customization to determine the content and/or the context and selecting an appropriate media content for providing the special effects according to the content and/or the context. For e.g., if the two images are photos captured by a user during the user's recent trip to New York, then the image selected to provide special effect may be an image of New York city. The selected image may be integrated with the two images so as to provide a background for the two images so that when the customized images are selected for rendering, the image of New York city may be rendered in the background while the images are rendered in the foreground at the playlist interface. FIG. 5 illustrates one such implementation. As illustrated, playlist customization module detects that video 1 and video 3 have been selected for customization, analyzes the contents to determine that the content relates to New York city and adds one or more images of New York city in the background. It should be noted that additional customization may be performed on the selected media content using other customization options available at the customization interface. As illustrated in FIG. 5, the video 1 and video 3 are merged together and image 1 is added as a transition between the two videos. In addition, an image of New York city is selected for providing the background and an audio recording is selected from the music category to provide the audio during rendering of the customized media content.

In some implementations, the playlist customization module may provide a list of media content under each customization options available at the customization interface. Based on user selection, appropriate customization may be implemented at the selected media content. For e.g., under the background customization option, the customization module may provide a plurality of images of New York city based on the analysis of the content and/or context of the selected media content for user selection. Based on the user's selection, the playlist customization module may provide the appropriate image of New York city as the background when rendering the customized media content. The playlist customization module integrates all the customization to generate customized media content. The customized media content may be categorized under the category to which the media content selected for customization belong, under a different category or under a separate category. For e.g., in the above example, the playlist categorization module 310 may categorize the customized media content related to videos 1 and 3 under the video category or under a separate custom category.

In some implementations, a portion of media content may be selected for customization. In such implementations, the customization module gathers the selected portions of one or more media content and creates the customized media content by merging the selected portions. The customized media content may or may not include special effects. In some implementations, the customized media content is stored in a category that is different from the category from which the portions of media content were selected. For e.g., one or more images/photos from the images category may be selected for generating a customized media content and the customized media content may be categorized under the video category instead of the photos/images category.

In addition to the customization option, the playlist manager may enable re-organization of media content within the playlist. Referring back to FIG. 3, the playlist manager may provide dynamic ranking and re-organization of media content within the playlist using a playlist ranking module 314. The playlist ranking module 314 receives user activity information associated with the selected media content in the playlist from the device 210 and based on the user activity dynamically adjusts the ranking of the media content within each category. In some implementations, some of the user activities captured and transmitted by the device 210 may be related to selection, deletion, addition or changing of media content in each category of the playlist. The user activities reflect the user's interest in the media content under each category within the playlist. Consequently, in addition to adjusting the ranking of the media content within each category of the playlist, the interest indicator for each category in the playlist of the user associated with the user account is updated to reflect the adjusted ranking of the media content based on the user activities.

Continuing to refer to FIG. 3, a playlist statistics engine 316 provided within the playlist manager 194 is configured to interact with the playlist ranking module to obtain the user's activities defining the user's interest and updates the appropriate interest indicators of the user. The updated interest indicators for the categories associated with the user are stored for the user in the user data storage 198.

A user interest metrics module 318 within the playlist manager 194 is configured to interact with the playlist statistics engine 316 and detect the updates to the interest indicators of the user. The user interest metrics module 318 analyzes the updated interest indicator information to obtain the user's current interests in various categories. In some implementations, this information may be used to direct promotional media and other media content to the user. In such implementations, the updated interest indicator information is passed on to an advertisement engine 320 that uses this information to identify other media content/promotional media that match the user's current interests. The identified media content/promotional media is retrieved from an advertisement storage (not shown) and returned along with the playlist and content data to the page processing 182 in the property server for inclusion in the property page that is forwarded to the device 210 for rendering at the display 218. As the user continues interaction at the property page and the playlist interface, such interactions are monitored and the playlist and the interest indicators associated with the user and any promotional media content directed to the user are refined to reflect the user's evolving interest.

In some implementations, a portion or all of the media content within the playlist may be shared with other users within the social network of the user. A control for enabling sharing is provided at the playlist interface in the form of a button, icon, etc. When the sharing option is selected, a playlist sharing module 312 is triggered. The user may selectively share a portion of a media content in the playlist, some of the media content in the playlist or the entire playlist with one or more users in one or more social groups in the social network of the user. The playlist sharing module 312 detects the user's selection of media content/playlist identified for sharing. The playlist sharing module 312 also receives distribution information of select one or more users within one or more social group of the user that are identified for sharing the identified media content. The distribution information identifies the format and mode of distribution of the shared media content. In some implementations, the mode of distribution may be an email, a multimedia message, a blogpost, a posting, etc. The playlist sharing module bundles the selected media content/playlist in accordance with the distribution information associated with the one or more users identified for sharing and forwards the bundled media content/playlist to the one or more users within the user's one or more social groups.

The playlist manager of a second user receives the shared media content/playlist from the first user, monitors the second user's interactions at the one or more shared media content/playlist and determines the second user's interest based on the second user's interactions at the one or more shared media content/playlist. The various modules within the playlist manager updates the second user's interest indicators based on the second user's interactions at the respective ones of the shared media content. In some implementations, based on the interest indicators of the second user, the playlist manager of the second user integrates the shared media content with the playlist of the second user, if the second user has a playlist. In some implementations, if the second user does not have a playlist or opts to keep the shared media content separate from the existing playlist, the playlist manager may generate a new playlist for the second user by organizing the shared media content into respective categories. The ratings of a plurality of users may be tabulated to determine the popularity of the shared media content and use the ratings for organizing the media content under each category. The playlist manager also updates the interest indicators for each category of the playlist in response to receiving the shared media content from the first user.

In some implementations, when a second user receives a playlist of shared media content from a first user, the second user may choose to ignore the shared media content, at which time the playlist and the interest indicators of the second user are left unchanged. On the other hand, the user may choose to view the media content. In some implementations, during the viewing of the media content if the user likes some of the shared media content, the user may choose to integrate the select ones of the shared media content into his playlist. In such implementations, based on the user's actions at some of the shared media content, the media selection module 304, media categorization module 306 and the playlist rendering module 308 may work together to integrate the select ones of the shared media content into the second user's playlist. The media selection module 304 detects the selection of some of the shared media content and analyzes the content to determine the content type of the select ones of the shared media content. The media categorization module determines the category for the select ones of the shared media content based on the content type and integrates the select ones of the shared media content into the appropriate category within the playlist of the second user based on the analysis of the content. The playlist rendering module renders the playlist with the integrated select ones of the shared media content at the display of the device 210 of the second user.

In some implementations, the user may integrate part of or all of two different playlists to generate a single playlist. The first playlist may be generated for the first user in the current session and the second playlist may either be shared by a second user or may be associated with the first user but may have been generated during an earlier session of the user. The playlist interface provides the ability to merge the two playlists to generate a single playlist by merging the media content in one or more categories of the two playlists together. During the merging, one or more media content may be selected for customization or removal from the first or the second playlist and the interest indicators for each category of the playlist for the user may be updated based on the merging and user actions. During the merging, the media content in one or more categories may be re-ordered or re-categorized based on the content and the user's interest. The merged playlist may include customized media content as a separate category are part of an existing category within the playlist. Portions of one or more media content or all of the media content in a particular category or all the categories of the merged playlist may be shared with other users. The merged playlist may be stored for the session or for the social group in which the user is a member, in the playlist data storage 322 for subsequent retrieval.

The playlist interface thus provides a competent organizing tool for automatically organizing a selective number of media content from a content stream of users postings available for the user account, into an organized playlist that reflects the user's interests. Portions of this focused and organized playlist is selectively shared with other users in one or more social groups, greatly enhancing a user's social network experience. In some implementations, the user may selectively share media content from different categories with different sets of users. Alternately, the user may selectively share different media content within a particular category with different sets of users. In some implementations, user actions at the media content may provide additional information on the rendered media content. For e.g., during the rendering of the selected media content, the user may click on the media content in the playlist interface and the playlist rendering module will direct the user to a original post in the content stream that included the media content. If the user double clicks on the media content, the user may be directed to a source webpage that provided the media content for the content stream.

Figure 6A:
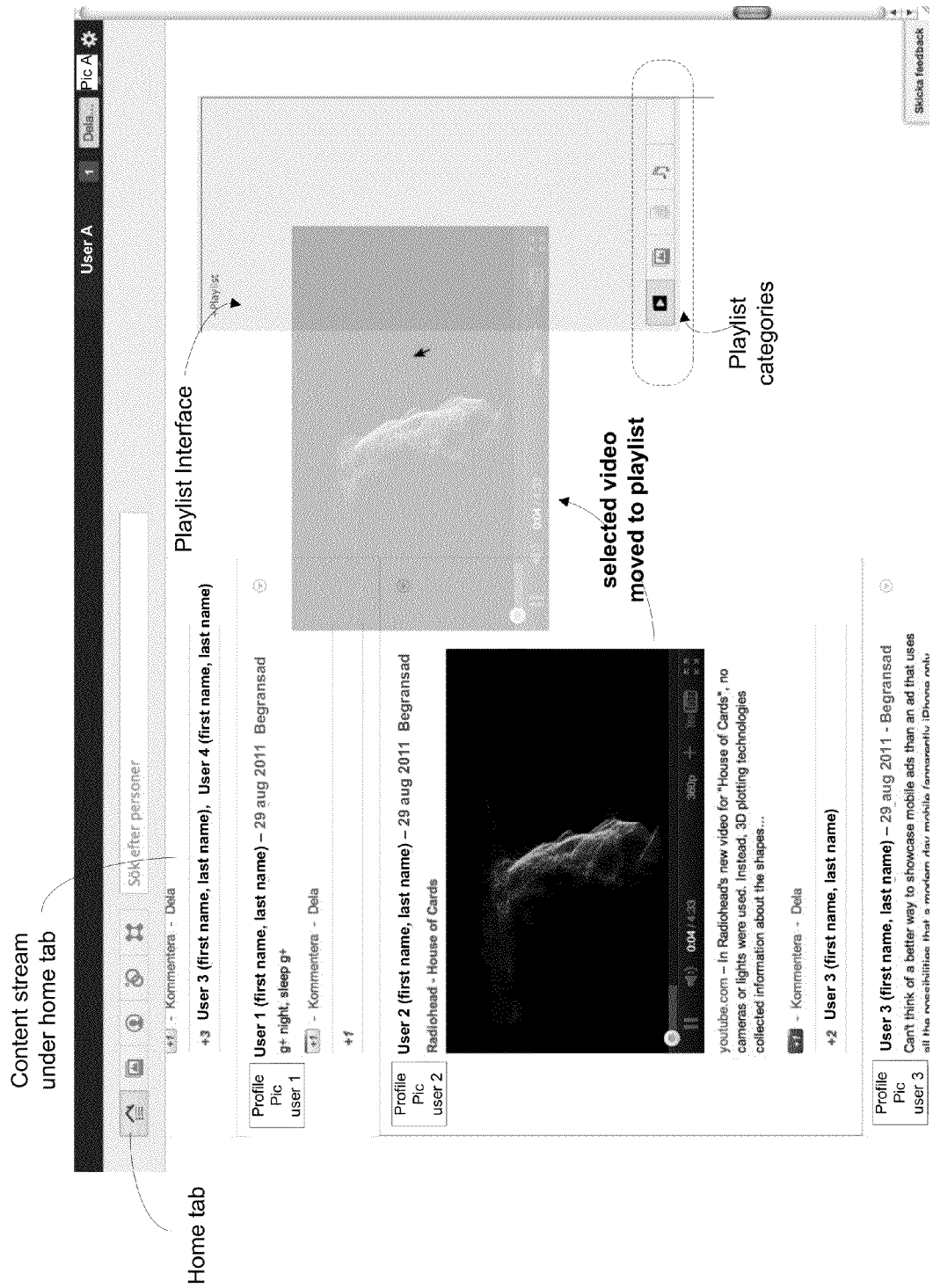
FIGS. 6a-6e illustrates sample screen shots of receiving, gathering, organizing and customizing a playlist with media content from a content stream, in accordance with implementations of the present disclosure.
Figure 6B:
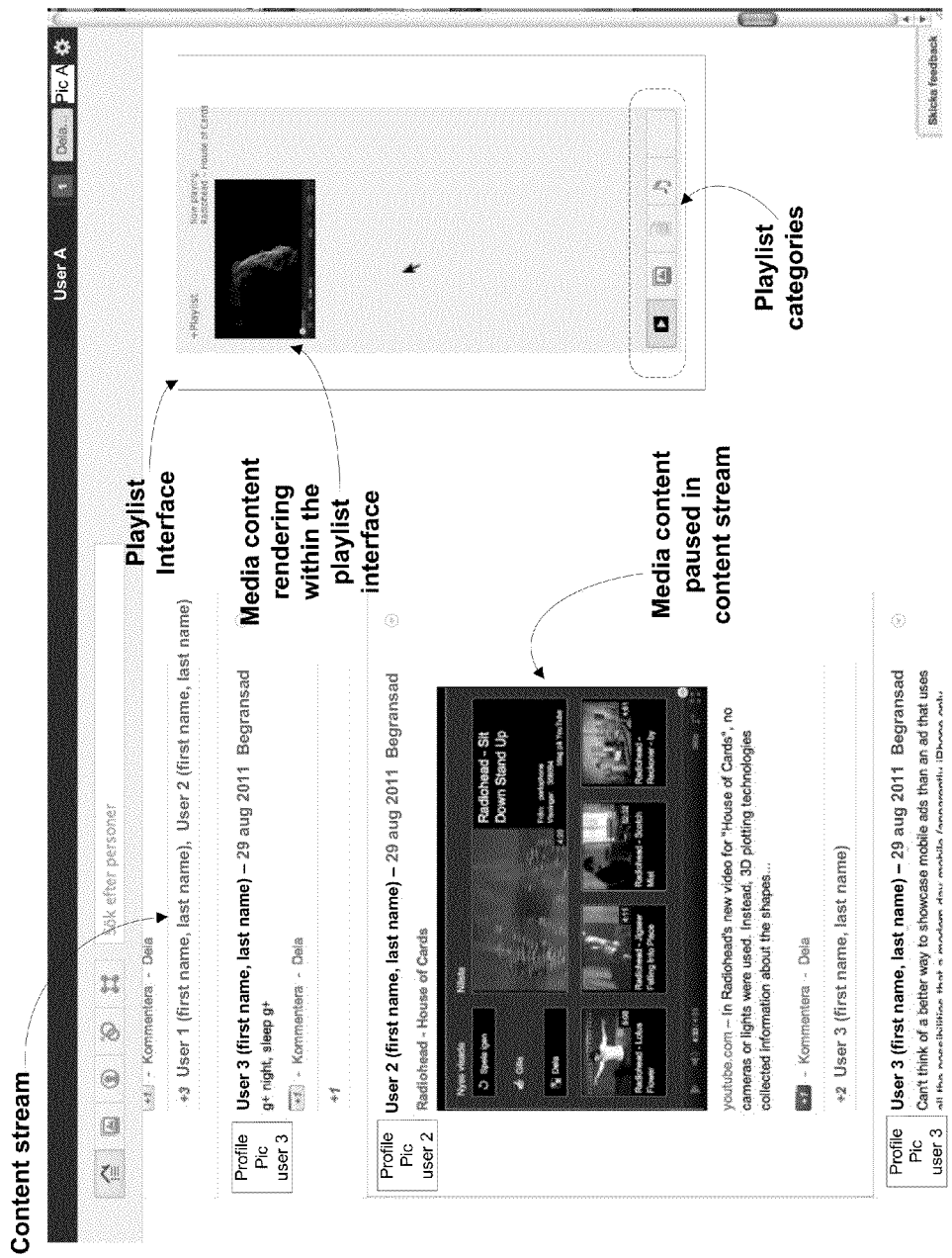
Figure 6C:
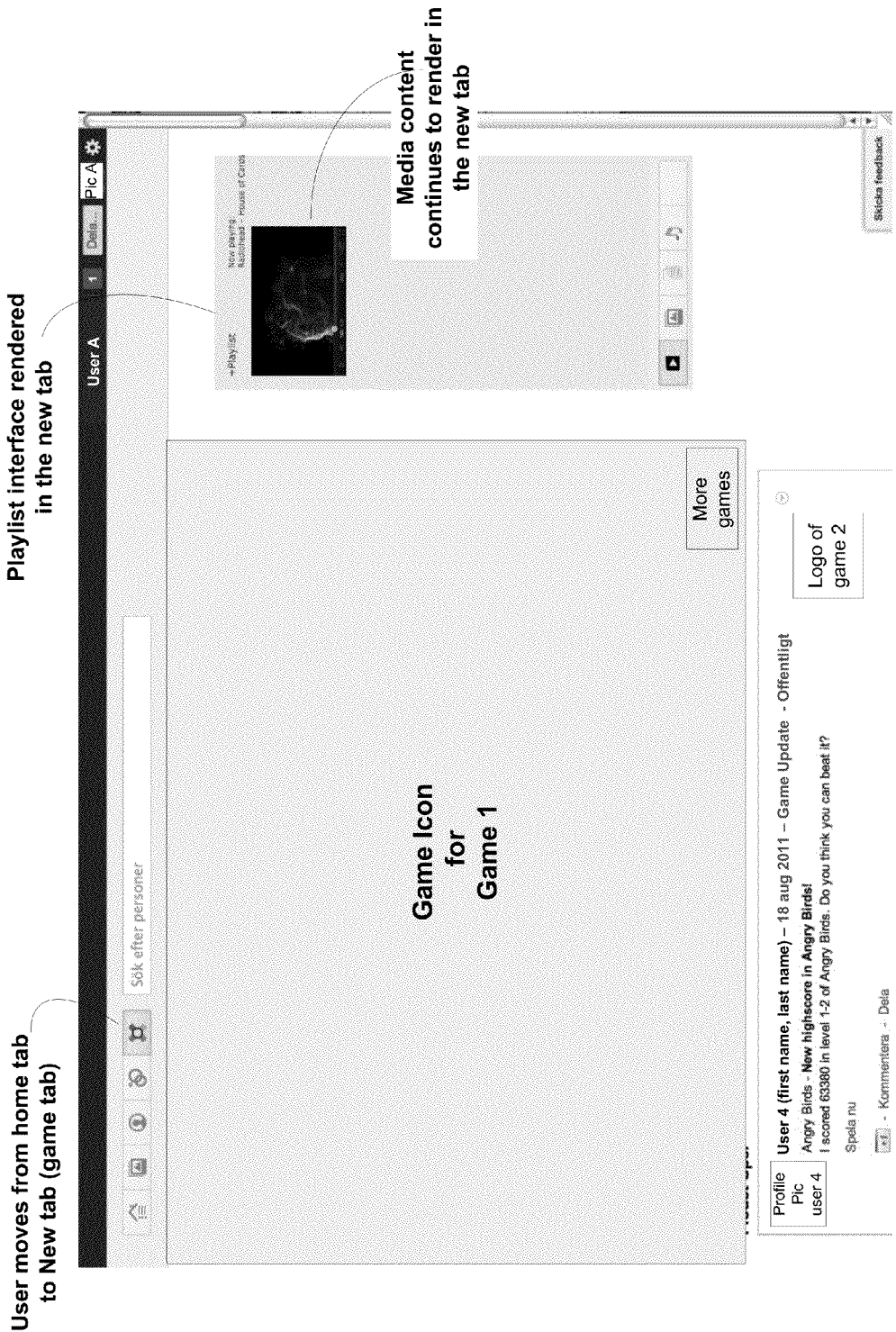
Figure 6D:
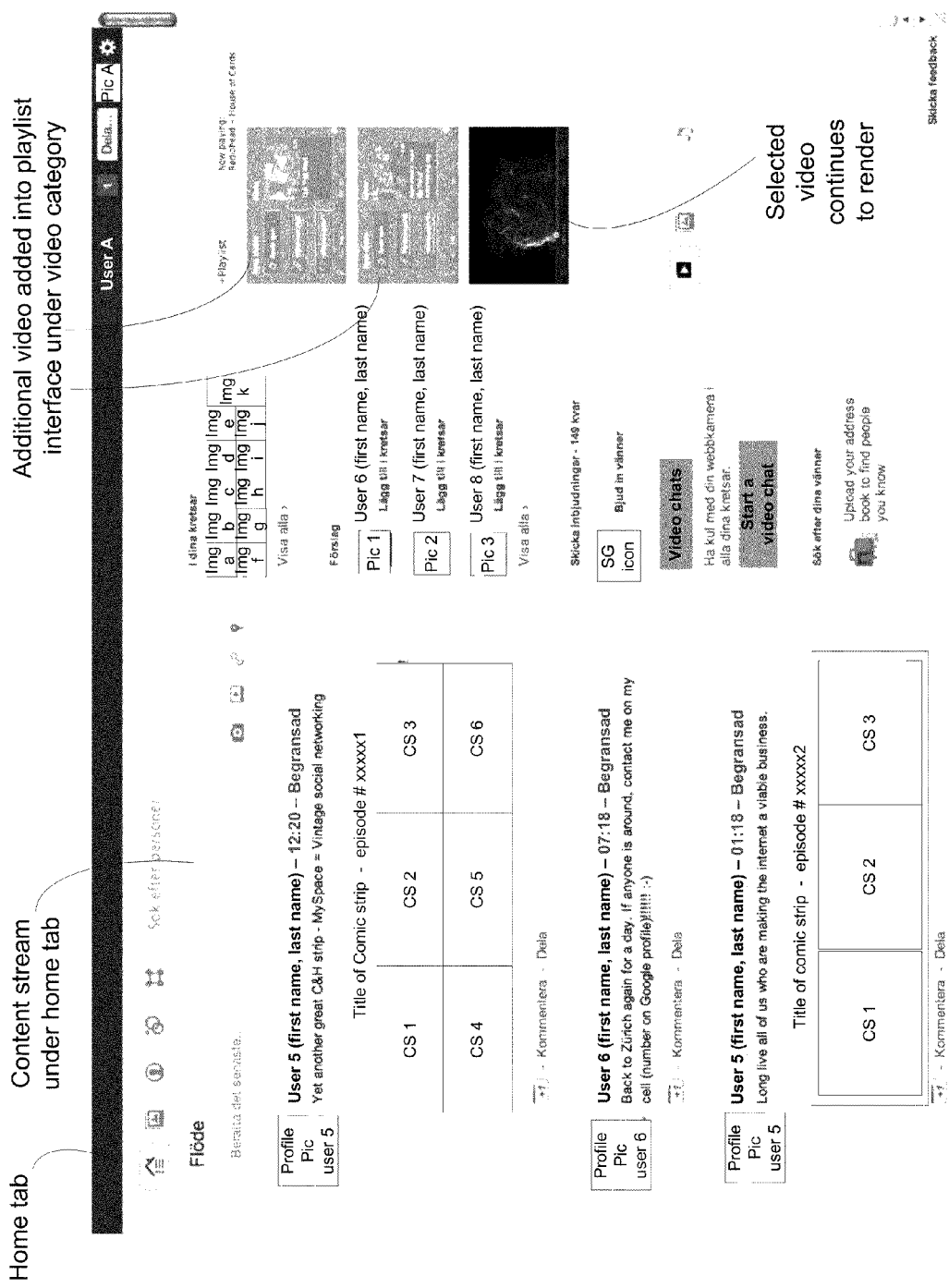

FIGS. 6A-6E illustrate a sample of online screen captures of the process of generating a playlist and customizing the generated playlist, in some implementations of the disclosure. As illustrated in FIG. 6A, a user may select a media content (e.g., a video) from a content stream provided under a 'home tab' and rendered on a display device that was used for accessing the user account, for including in a playlist. The process of adding the selected media content to the playlist interface is shown in FIG. 6A as using a drag-and-drop operation. During the dragging and dropping phase, the selected media content becomes paused in the content stream and the playlist takes over the rendering of the selected media content. FIG. 6B illustrates the rendering of the selected media content (e.g. the video) upon adding the media content to the playlist interface. The selected media content continues to render at the playlist interface as the user moves from the home tab to a 'game' tab, as illustrated in FIG. 6C, or as the user continues to browse down the content stream. The rendering of the selected media content in the playlist interface is uninterrupted and is visible to the user at all times the user is in the property page even as the user moves from one tab to another or moves up and down the stream. The user may add additional media content to the playlist interface, as shown in FIG. 6D, while the selected media content continues to render at the playlist interface. The playlist interface provides an easy-to-overview playlist under each category. The implementation shown in FIG. 6D illustrates the playlist under video category.

Figure 6E:
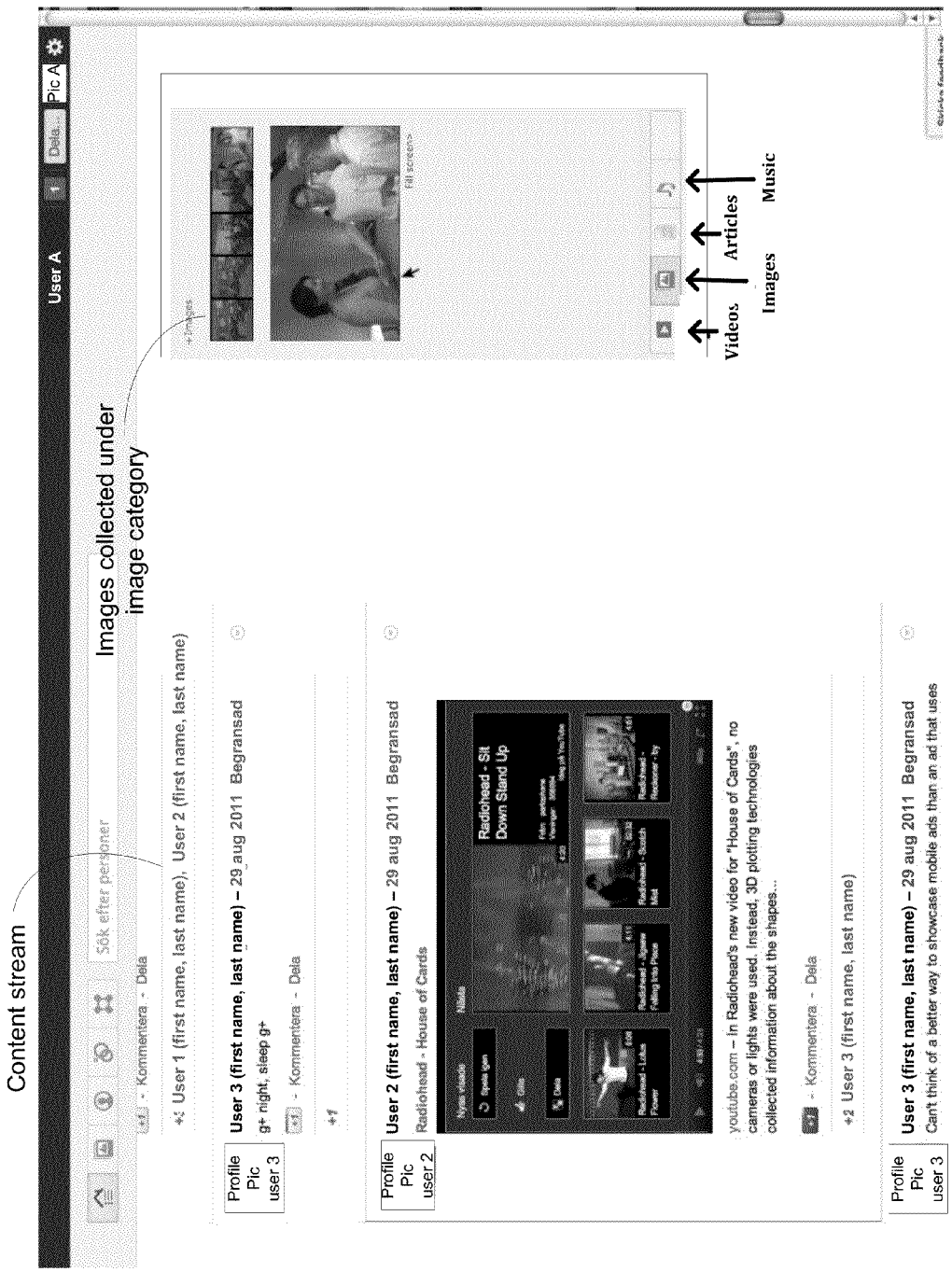

A user can select a different category in the playlist to view the media content that is gathered under the selected category. For e.g., as illustrated in FIG. 6E, when the user selects the image category in the playlist interface, the user is provided with the media content gathered under the image category. The playlist manager may gather one or more images that the user has selected from the content stream under the image category and compile customized media content of the images to comply with the user's preference. This may include providing special effects using one or more media content available within the playlist, available in the property page or available to the user account and re-categorizing the compiled media content irrespective of how the media content was originally categorized by other users.

The playlist interface also provides the user with the ability to remove individual media content or a bulk of media content gathered under one or more categories allowing the user to adjust the media content within the various categories of the playlist according to the user's own preferences and liking. The generated playlist may be saved for subsequent retrieval and update, or can be discarded in its entirety after the user's current session. When the user accesses the property page through the user account, the user is provided with an option to resume the playlist from the previous session or to start a new playlist. When the user selects to resume the playlist from the previous session of the user, the playlist manager retrieves the playlist from the previous session and renders the playlist at the playlist interface in the property page. The user is then allowed to update the playlist by browsing the content stream and adjusting the playlist or by browsing the different categories within the playlist and determining which media content to keep and which ones to discard. When the playlist is specific to a social group of a user, the playlist manager may retain the playlist generated for the user account for a pre-defined time period before discarding the content and clearing the playlist or may retain the playlist until explicit instructions to discard the content of the playlist is received from the user.

The playlist provides information gathered about user's interests in order to enable providing highly relevant promotional media or other content to the user. The information is analyzed to identify these interests. The favorite media content/compilations that are actively saved serve as strong indicator of the interests of the user in the various categories. Looking at the themes and patterns of the media content that is gathered under each category would provide a deeper understanding of the user's interest. For e.g., temporarily saved media content would weigh lower than permanently saved media content during analysis when determining the user's interest. Sharing such strongly favored media content with other users would, in turn, assist in determining the other users interests. Thus, if a second user accepts the favored and focused compilation of playlist, it would mean that the playlist of the first user was relevant to the second user as well and, hence, the second user's interest are similar to the first user.

The playlist interface may also provide an export option to a user to export the playlist on to one or more of their computing devices further indicating the strong relevance of the gathered content in the playlist for the user. The various implementations provide the user with a way to capture media content that are most relevant to the user as well as those that are most relevant to other users into a focused list and manage this list for the user account while allowing the user to continue enjoying the interactions within the social network.

Figure 7:
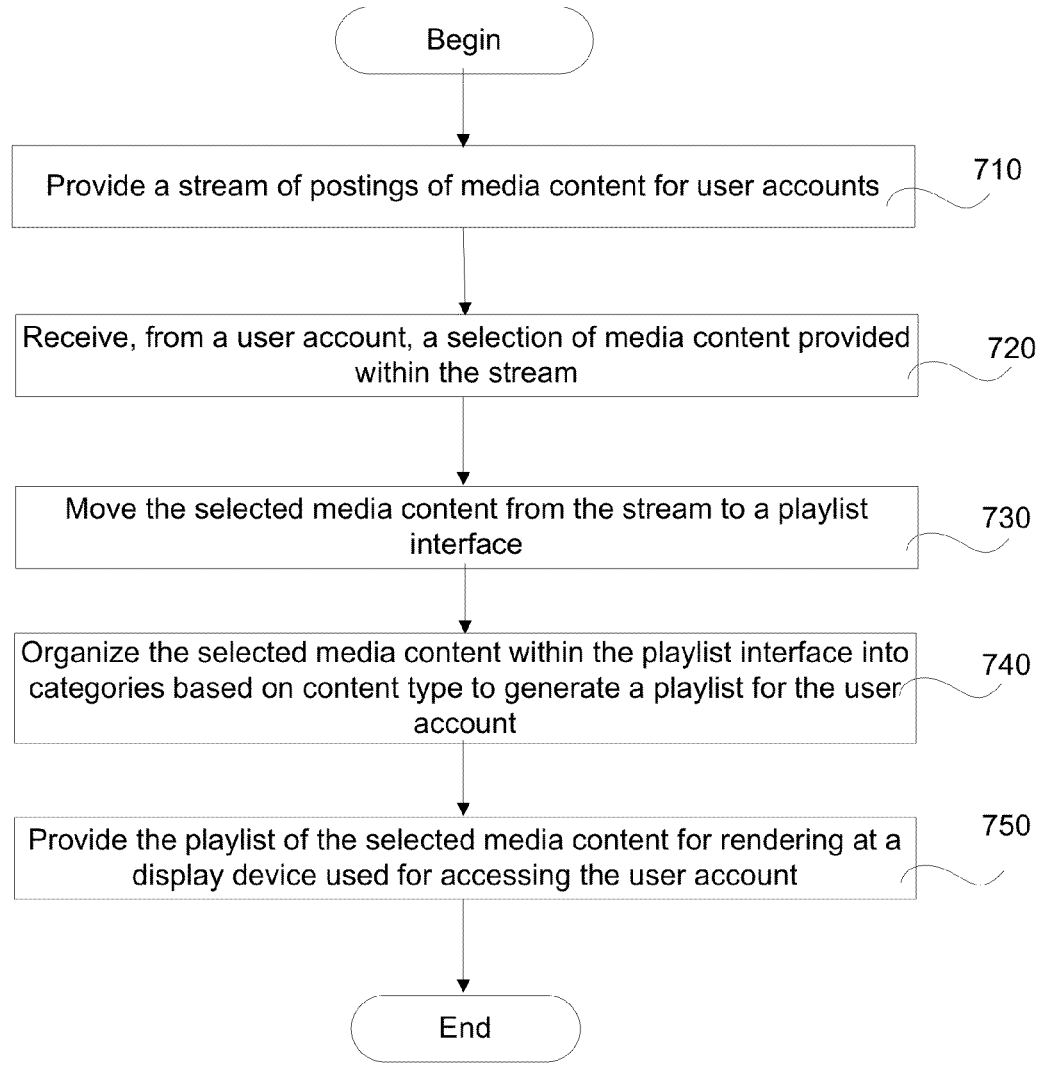
FIG. 7 illustrates process operations of a method for gathering and organizing media content, in accordance with some implementations of the present disclosure.

FIG. 7 illustrates a method for gathering and organizing media content in a social media, in some implementations of the present disclosure. The method is initiated through a playlist manager application executing on a processor of a server. The method begins at operation 710, wherein postings of media content received from a plurality of users is provided in a content stream for a user account. The media content includes postings of media content provided by the user and/or by other users within one or more social groups of the user. The content stream is provided in a property page for the user account when the user requests and accesses the property page. A user selects one or more of the media content from the content stream through user actions, as illustrated in operation 720. The selected media content are moved from the content stream to a playlist interface, as illustrated in operation 730. The media content in the playlist interface are organized into one or more categories, as illustrated in operation 740. The media content in the playlist is analyzed to determine the content type and an appropriate category is associated with the media content. The media content is then organized under the respective categories based on the content type and an organized playlist is generated for the user account. The organized playlist of selected media content is provided for rendering at a display device that is used to access the user account, as illustrated in operation 750. The organized media content indicates the user's interest in the various categories and this information can be used in recommending additional media content and/or determining promotional media for the user.

Figure 8:
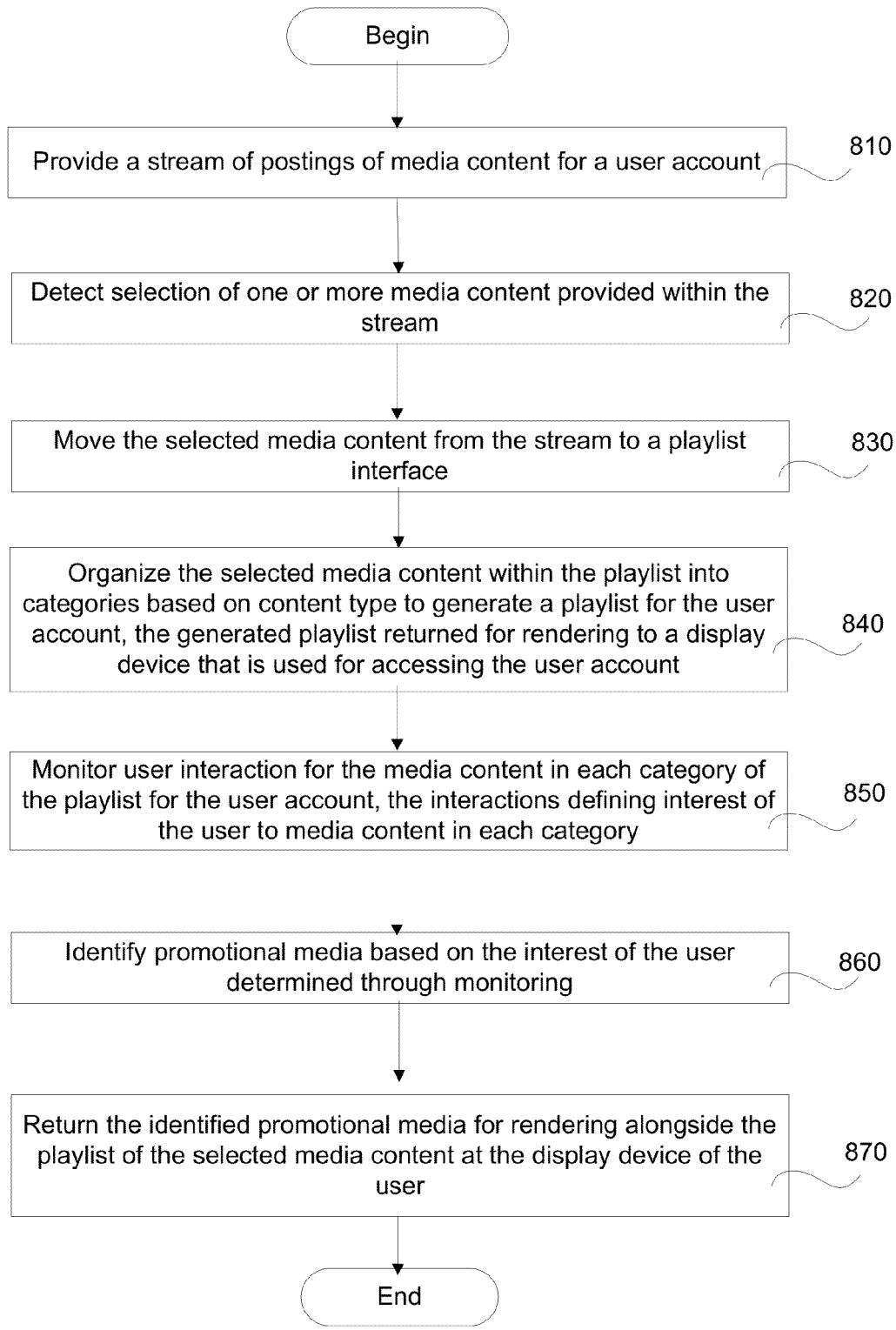
FIG. 8 illustrates process operations of a method for gathering and organizing media content, in accordance with some other implementations of the present disclosure.

FIG. 8 illustrates an alternate implementation of a method for gathering and organizing content in a social media. The method begins with postings of media content being provided in a content stream, as illustrated in operation 810. The postings are one of commercial postings and user postings. The user postings are received from one or more users within one or more social groups and the media content provided in the postings include user generated content and/or non-user generated content. In some implementation, the content stream is provided in a social network property page when the user accesses the property page of the user account. User selection of one or more of the media content within the content stream is detected through user actions at the respective media content in the content stream, as illustrated in operation 820. The selected media content are moved to a playlist interface from the content stream, as illustrated in operation 830. The selected media content within the playlist interface is organized into one or more categories to generate a playlist for the user account, by analyzing the selected media content to determine content type, as illustrated in operation 840. In some implementations, the analysis may also determine a sub-category within the category under which the media content may be categorized. The media content is then be organized under the respective categories/sub-categories within the respective categories based on the analysis. The playlist is returned along with the content stream to a display device that is used for accessing the user account, for rendering in a property page. The playlist interface provides a multi-media canvas for gathering the selected media content for the user. User interaction at the media content in each of the categories is monitored to determine the interest of the user to the media content and the category, as illustrated in operation 850. The user interaction at the media content indicative of the user's interest in the various media content and the respective categories is used in identifying promotional media for the user, as illustrated in operation 860. The identified promotional media is returned for rendering alongside the playlist at the display device of the user, as illustrated in operation 870. The promotional media may be integrated into the social network property page for the user account alongside the stream of postings of media content. The property page is returned to the user device for rendering. The process of detecting, adding, organizing, monitoring, identifying and rendering of the promotional media and the media content continue as long as the user is on the property page.

Figure 9:
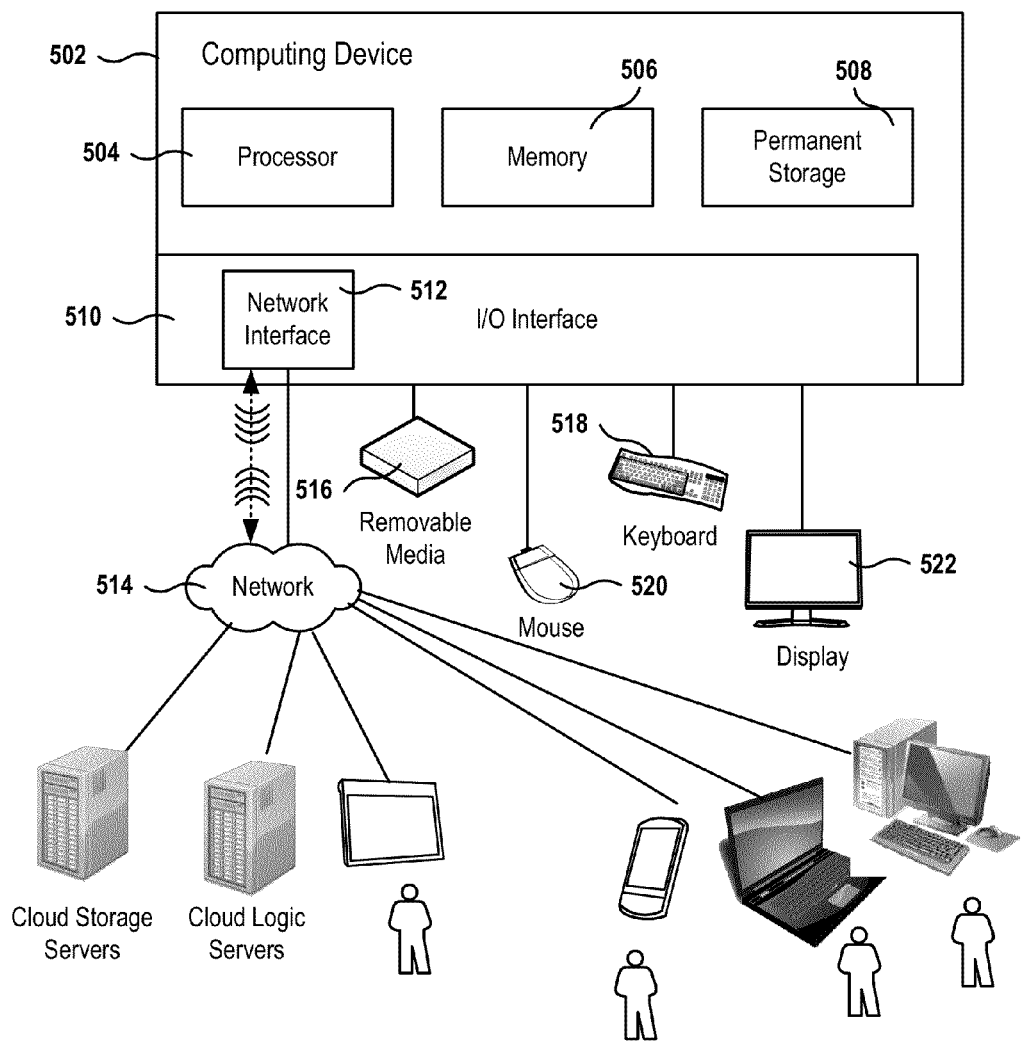
FIG. 9 illustrates a simplified schematic diagram of a computer system for implementing various implementations of the present disclosure.

FIG. 9 is a simplified schematic diagram of a computer system 502 used for implementing the present disclosure. FIG. 9 depicts a sample computer environment for implementing various implementations of the disclosure. It should be appreciated that the methods described herein may be performed with a digital processing system, such as a conventional, general-purpose computer system. Special purpose computers, which are designed or programmed to perform only one function, may be used in the alternative. The computer system 502 includes a processor 504, which is coupled through a bus to memory 506, permanent storage 508, and Input/Output (I/O) interface 510.

Permanent storage 508 represents a persistent data storage device such as a hard drive or a USB drive, which may be local or remote. Network interface 512 provides connections via network 514, allowing communications (wired or wireless) with other devices. It should be appreciated that processor 504 may be embodied in a general-purpose processor, a special purpose processor, or a specially programmed logic device. Input/Output (I/O) interface 510 provides communication with different peripherals and is connected with processor 504, memory 506, and permanent storage 508, through the bus. Sample peripherals include display 522, keyboard 518, mouse 520, removable media device 516, etc.

Display 522 is configured to display the user interfaces described herein. Keyboard 518, mouse 520, removable media device 516, and other peripherals are coupled to I/O interface 510 in order to exchange information with processor 504. It should be appreciated that data to and from external devices may be communicated through I/O interface 510. Embodiments of the invention can also be practiced in distributed computing environments where tasks are performed by remote processing devices that are linked through a wired or a wireless network.

Embodiments of the present invention can be fabricated as computer readable code on a non-transitory computer readable storage medium. The non-transitory computer readable storage medium holds data that can be read by a computer system. Examples of the non-transitory computer readable storage medium include permanent storage 508, network attached storage (NAS), read-only memory or random-access memory in memory module 506, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Additionally, FIG. 9 shows various types of devices that can connect to the network, such as the Internet. The devices include servers, tablet computers, smartphones, laptops, desktops, etc. The various devices can run operating systems, and the operating systems can vary from manufacturer to manufacturer.

Some, or all operations of the method presented herein are executed through a processor, such as processor 504 of FIG. 9. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

What is claimed is:

1. A method, comprising:
providing a stream of postings including media content for user accounts;
receiving, from a user account of a particular user, a selection of media content provided in the stream;
moving the selected media content from the stream to a playlist interface;
organizing the selected media content within the playlist interface into categories based on content type to generate a playlist for the user account of the particular user;
providing the playlist of the selected media content for rendering at a display device used for accessing the user account;
assigning relative ranking to the media content in respective categories of the playlist associated with the particular user;
monitoring user interactions for the media content within each category of the playlist for the user account of the particular user; and
adjusting the relative ranking to the media content in the respective categories of the playlist associated with the particular user based on the monitored user interactions.

2. The method of claim 1, wherein the postings are one of commercial postings or user postings, the user postings are received from one or more users within one or more social groups, and wherein the media content in the postings include user generated content and non-user generated content.

3. The method of claim 1, wherein adding the selected media content further comprises:
determining a category within the playlist for organizing the selected media content based on the content type;
placing the selected media content under the category of the playlist; and
updating an interest indicator for the category of the playlist that is associated with the user account.

4. The method of claim 1, further comprises customizing one or more media content within the playlist, wherein the type of media content is one of video, image, music, articles or combinations thereof.

5. The method of claim 4, wherein the customization of media content further comprises:

adjusting a ranking of the media content in a particular category based on user interaction for the corresponding media content within the particular category of the playlist.

6. The method of claim 4, wherein the customization of media content further comprises:
receiving a selection of a subset of the media content; and
compiling a customized media content of the selected subset of media content, wherein the media content within the subset are associated with a particular category within the playlist or a plurality of categories within the playlist and wherein the media content within the subset includes at least a portion of one or more of the media content within the playlist.

7. The method of claim 6, wherein compiling further comprises adding special effects to the media content within the subset, wherein the special effects are provided using other media content from one or more categories available for the user account.

8. The method of claim 1, further comprising:
adjusting the relative ranking of the media content within each category of the playlist based on addition or removal of one or more media content from the one or more categories in the playlist; and
adjusting interest indicators related to the respective categories in the playlist for the user account.

9. The method of claim 1, wherein the playlist is specific to a session or a social group of a user associated with the user account.

10. The method of claim 1, further comprising:
analyzing media content within the playlist of a particular user associated with the user account to determine interest of the particular user; and
selecting promotional media for rendering alongside the playlist at the display device.

11. The method of claim 1, further comprises providing control at the playlist interface to enable sharing of one or more media content within the playlist with other users within one or more social groups of a particular user associated with the playlist, the sharing comprising:
receiving selection of one or more media content from the particular user, wherein the identified media content belong to one or more categories;
receiving distribution information related to select one or more other users within the one or more social groups of the particular user for sharing the select media content; and
forwarding the identified media content to the select one or more users using the distribution information.

12. The method of claim 11, further comprising:
determining interactions of the select one or more of the other users at the shared media content, the interactions indicative of interest of the respective users to the shared media content; and
updating interest indicators associated with corresponding categories of the shared media content of the respective users based on the respective users interactions, the interest indicator used in identifying promotional media for returning with the playlist for rendering at the display device of the respective users.

13. The method of claim 1, wherein the playlist returned for rendering comprises placement information appropriate for the display device of the user used for accessing the user account.

14. A system, comprising:
a processor of a server to:
validate access to user accounts;
receive postings of media content from a plurality of users;
provide a content stream of postings for the user accounts;
manage the content stream of postings for the user accounts;
analyze the media content within the content stream to identify content type;
provide a playlist interface for moving the selected media content from the content stream;
generate a playlist with the selected media content;
organize the selected media content within the playlist into one or more categories based on the content type obtained from the stream manager module;
return the playlist for rendering on a display device used for accessing the user accounts;
assign relative ranking to the media content in respective categories of the playlist associated with the particular user;
monitor user interactions for the media content within each category of the playlist for a user account of a particular user; and
adjust the relative ranking of the media content in the respective categories of the playlist associated with the particular user based on the monitored user interactions.

15. The system of claim 14, wherein the processor of the server is further to:
provide customization to the media content in the playlist, wherein the customization includes any one or more of:
(i) re-organizing the media content in the respective categories based on the relative ranking of the media content in the playlist;
(ii) merging media content within one or more categories in the playlist to generate customized media content;
(iii) integrating one or more media content from a second playlist into the respective categories within the playlist;
(iv) monitor new user interactions for the media content within each category of the playlist for the user account of the particular user; and
(v) adjust the relative ranking of the media content in the respective categories of the playlist associated with the particular user based on the new user interactions;
provide control at the playlist interface to enable selective sharing of one or more media content within the playlist with other users within one or more social groups of the particular user;
receive selection of one or more media content under one or more categories within the playlist, from the particular user;
receive distribution information related to select one or more of the other users within the one or more social groups of the particular user for sharing the media content; and
forward the identified media content to the select one or more of the other users using the distribution information of the select users.

16. The system of claim 14, wherein the processor is further to:
monitor interactions at the media content in each category of the playlist associated with the user account of a particular user to determine interest of the particular user in each category;
update interest indicators for respective categories of the playlist associated with the user account of the particular user based on the interactions, the interest indicators defining interest of the particular user for each category;

identify promotional media to render alongside the playlist based on the interest of the particular user for each category in the playlist; and store the interest indicators in each category of the playlist for the user accounts for subsequent analysis.

17. A method comprising:

providing a stream of postings of media content for a user account;

detecting selection of one or more media content provided within the stream;

moving the selected media content from the stream to a playlist interface;

organizing the selected media content within the playlist interface into categories based on content type to generate a playlist for the user account, the organized playlist returned for rendering at a display device used for accessing the user account;

assigning relative ranking to the media content in respective categories of the playlist associated with the particular user;

monitoring user interactions for the media content in each category of the playlist for the user account, the interactions defining interest of the user to media content in each category;

adjusting the relative ranking of the media content in the respective categories of the playlist associated with the particular user based on the monitored user interactions;

identifying promotional media based on the interest of the user determined through monitoring; and returning the identified promotional media for rendering alongside the playlist of the selected media content at the display device of the user.

18. The method of claim 17, wherein moving the selected media content further comprises:

updating interest indicators associated with each category of the media content within the playlist of the user account based on the monitored user interaction; and adjusting the relative ranking of the media content in each category of the playlist based on the interest of the user.

19. The method of claim 17, further comprises:

receiving a second playlist having one or more media content in one or more categories;

monitoring user interactions at select ones of the media content in the second playlist, the interactions defining interest of the user for the select ones of the media content in the second playlist; and integrating the select ones of the media content from the second playlist into the respective categories of the playlist associated with the user account based on the user's interest, wherein one or more media content from the playlist associated with the user account selected for sharing with other users within one or more social groups of the user.

20. The method of claim 19, wherein integrating includes providing a control to enable customizing one or more media content in one or more categories of the playlist during integration, wherein the customizing comprises:

receiving a selection of a subset of the media content belonging to one or more categories from the playlist after integration;

compiling customized media content by merging the selected subset of media content, the compilation includes adding special effects to the selected subset of media content using one or more media content available within the user account; and placing the customized media content into one of the categories in the playlist or in a new category within the playlist.

* * * * *